(12) United States Patent
Fu et al.

(10) Patent No.: US 6,882,793 B1
(45) Date of Patent: Apr. 19, 2005

(54) VIDEO PROCESSING SYSTEM

(75) Inventors: Sai-Wai Fu, Los Altos, CA (US); Hon Pun Sit, Fremont, CA (US); Subutai Ahmad, Palo Alto, CA (US); Sadie Louise Honey, Oakland, CA (US); Adwait Ullal, Saratoga, CA (US); Jeffrey Layne Edwards, Southlake, TX (US)

(73) Assignee: YesVideo, Inc., San Jose, CA (US)

( * ) Notice: Subject to any disclaimer, the term of this patent is extended or adjusted under 35 U.S.C. 154(b) by 498 days.

(21) Appl. No.: 09/595,615

(22) Filed: Jun. 16, 2000

(51) Int. Cl.$^7$ .............................................. H04N 5/91
(52) U.S. Cl. ........................ 386/95; 385/125; 385/126
(58) Field of Search ........................... 386/46, 68, 69, 386/95, 111, 125, 126, 52, 54, 55; 382/232; 705/10; 348/565, 906; 725/87

(56) References Cited

U.S. PATENT DOCUMENTS

| | | | |
|---|---|---|---|
| 5,157,511 A | * 10/1992 | Kawai et al. ................... 386/68 |
| 5,485,611 A | * 1/1996 | Astle .......................... 348/563 |
| 5,546,191 A | 8/1996 | Hibi et al. |
| 5,576,950 A | * 11/1996 | Tonomura et al. ............. 386/95 |
| 5,642,294 A | 6/1997 | Taniguchi .................... 364/514 |
| 5,713,022 A | * 1/1998 | Yamashita ................ 707/104.1 |
| 5,767,922 A | 6/1998 | Zabih .......................... 348/700 |
| 5,805,733 A | * 9/1998 | Wang et al. ................. 382/232 |
| 5,818,439 A | * 10/1998 | Nagasaka et al. ............. 725/87 |
| 5,909,551 A | * 6/1999 | Tahara et al. ................ 709/231 |
| 5,920,360 A | 7/1999 | Coleman ..................... 348/700 |
| 5,974,218 A | 10/1999 | Nagasaka et al. |
| 6,026,434 A | 2/2000 | Kubota et al. |
| 6,085,020 A | * 7/2000 | Saito et al. .................... 386/54 |
| 6,134,531 A | * 10/2000 | Trewitt et al. ................ 705/10 |
| 6,141,489 A | 10/2000 | Honda |
| 6,154,601 A | 11/2000 | Yaegashi et al. .............. 386/52 |
| 6,154,771 A | * 11/2000 | Rangan et al. .............. 709/219 |
| 6,185,363 B1 | * 2/2001 | Dimitrova et al. ............ 386/69 |
| 6,262,724 B1 | * 7/2001 | Crow et al. ................. 345/723 |
| 6,275,451 B1 | * 8/2001 | Park et al. .................... 386/95 |
| 6,307,550 B1 | * 10/2001 | Chen et al. ................. 345/418 |
| 6,449,608 B1 | * 9/2002 | Morita et al. ................. 386/83 |
| 6,453,119 B1 | * 9/2002 | Maruyama et al. ........... 386/95 |

FOREIGN PATENT DOCUMENTS

| | | |
|---|---|---|
| EP | 1154432 | 11/2001 |
| EP | 1074989 | 2/2002 |
| GB | 2312078 | 10/1997 |
| JP | 08-315550 | 11/1996 |
| WO | 01/28238 | 4/2001 |

\* cited by examiner

*Primary Examiner*—Huy Nguyen
(74) *Attorney, Agent, or Firm*—Fish & Richardson P.C.

(57) ABSTRACT

A method and apparatus for producing video content. The method includes acquiring video data from a source. If the video data is not digitized, then the video data is digitized. The method includes generating scene indexes for the video data including a representative still image for each scene and combining the video data and scene indexes along with a media player on a video disc. The video player is operable to play the video data in accordance with the scene indexes including playing a scene from the video data on a client computer while displaying the representative stills for other of the scenes available for display on the video disc.

32 Claims, 18 Drawing Sheets

VIDEO PROCESSING SYSTEM

The present invention relates generally to computer systems and more particularly to methods and apparatus for collecting, editing and distributing video content.

BACKGROUND

Video camcorders have been around for many years and provide non-professional users an easy and an inexpensive mechanism for capturing life moments. Conventional video footage recorded by non-professional users suffer from three major problems that have no practical solutions. The longevity of a conventional video tape is approximately 10 years, after which the tapes degrade rather quickly. Homeowners and renters alike typically store video tapes in non-secure storage means that are susceptible to theft and damage (e.g, fire, flood and other natural disasters). Finally, most video tape recorded by conventional non-professional users includes a more junk than real footage. That is, non-professional users of camcorders tend to not set up their shots and as such over record, creating undesirable junk footage. Conventional editing tools where available are difficult to use and very time consuming. As such, most non-professional users keep all of the raw footage on tape without editing out the junk.

Conventional solutions to these problems are either inadequate or too expensive. Tape to tape duplication services are available, but costs are not trivial and the duplicate tapes suffer from the same limitations discussed above. Professional encoding of video tapes to optical disks is very expensive typically on the order of magnitude of $60/min. Home equipment for digital encoding and editing where available is expensive and time consuming to operate.

SUMMARY

In one aspect the invention provides a method for producing a video disc and includes acquiring video data from a source. If the video data is not digitized, then the video data is digitized. The method includes generating scene indexes for the video data including a representative still image for each scene and combining the video data and scene indexes along with a media player on a video disc. The video player is operable to play the video data in accordance with the scene indexes including playing a scene from the video data on a client computer while displaying the representative stills for other of the scenes available for display on the video disc.

Aspects of the invention can include one or more of the following features. The step of acquiring can include capturing the video data from an analog source or a digital source. The step of generating scene indexes can include detecting a transition between consecutive frames in the video data, determining when the transition indicates a scene break and marking the end of the previous scene and a beginning of a new scene at a point in time that corresponds to the initially detected transition. The step of detecting a transition can include detecting a color difference between the frames and determining if a difference between frames exceeds a preset threshold.

The method can further include cropping one or more of the frames prior to the comparison to eliminate effects from the boundary of the image frame. The step of detecting a transition can include detecting a motion difference between the frames. The step of detecting a transition can include determining if a difference between frames exceeds a preset threshold.

The step of determining when a transition indicates a scene break can include comparing plural frames to a last frame thought to be part of a preceding scene. The step of generating representative stills for each scene can include selecting a first frame from each scene or a frame from an introductory group of frames from each scene. The step of selecting a frame can include determining a color distribution for plural frames in a scene and selecting a frame from the introductory group that is a best match to the determined color distribution. The method can include creating a contact sheet for distribution with the video disc that includes each representative still for the scenes detected on the video disc. The video disc can be a compact disc or a digital video disc.

In another aspect the invention provides a method for producing a video based product that includes acquiring video data and generating temporal indices including analyzing the video data to detect the temporal indices. The temporal indices indicate a division of the video data into distinct segments. The method includes providing a media player operable to play the video data on a client computer in accordance with the temporal indices and packaging the video data, the temporal indices and media player on a physical medium for delivery to the client computer.

Aspects of the invention can include one or more of the following features. The method can include digitizing the video data prior to packaging the video data and generating representative stills for one or more segments. The media player can be operable to display one or more of the representative stills while playing the video data on the client computer.

The method can include providing a media editor operable to generate one or more edit lists. Each edit list can define a set of operations to be performed on the video data by another computer so as to allow editing operations defined on one computer to be performed on the video data to be replicated on another computer. The method can include editing the video data in accordance with the edit lists on the another computer and distributing the edited video to user designated distributees. The packaging step can include producing a physical manifestation of the content to be delivered. The physical manifestation can be a video disc.

The packaging step can include producing a streaming version of the video data in accordance with the temporal indices, receiving a request to webcast the streaming version of the video data and streaming the streaming version to a requestor. The distribution of the edited video can include providing the edit list to a central distribution site, generating the edited video at the central distribution site and directly delivering the edited video to the distributees.

Aspects of the invention can include one or more of the following advantages. An efficient and inexpensive system is provided for collecting, digitizing and editing video content. The system includes digitizing equipment for digitizing analog and digital video input for distribution over the Internet. The system includes scene detection mechanisms for parsing the digitized content into plural scenes which can then be edited or otherwise manipulated by the user. The system provides tools for the user to easily combine plural scenes into a single composition (an album) which can be burned into a compact disc (CD) for distribution to plural sources. The composition can be viewed locally with streaming content, or can be burned into a CD. The content on the CD can be a high resolution or a streaming format. The system provides fully automated digital video editing services to allow users to manipulate each scene, combine scenes and integrate other input including audio and digital still pictures. The system combines an Internet web hosting service for viewing digitized content with video processing tools to facilitate the distribution of content to plural distributees. The system provides a menu of still frames, one for each detected scene in a digitized input. The system provides video search tools that can analyze scenes to search for particular content based on keywords.

CDs produced by the system can be archived or otherwise backed up to make available the original high quality content for later derivative work. Only desired high quality content will be archived through the interaction of the user in creating an edited album on the Web. The user can select from a high quality or a lower quality streaming version of the content when publishing an album. High quality still images can be extracted from the high quality content in a publish album. High quality stills can also be extracted from the high quality content archived by the system.

These and other advantages will be evident from the description below, the claims and the attached drawings.

DETAILED DESCRIPTION

As used herein the term "Video Data" refers to an image stream, audio stream or synchronized image and audio stream.

"Physical media," as used herein, refers to means for storing digitized content and can include a video disc, floppy disc, zip drive, minidisc, magnetic tape, CD-ROM, VCD and DVD.

"Segment," as used herein, refers to a definable portion of video data. Tools described below can be used to locate segments of the video data. Portions of the description below are described with reference to a scene. A scene is a type of segment often associated with a image stream. While the description sets forth particular details of scene detection and other scene features, those of ordinary skill in the art will recognize that the invention is equally suited to process other video data types.

Figure 1:
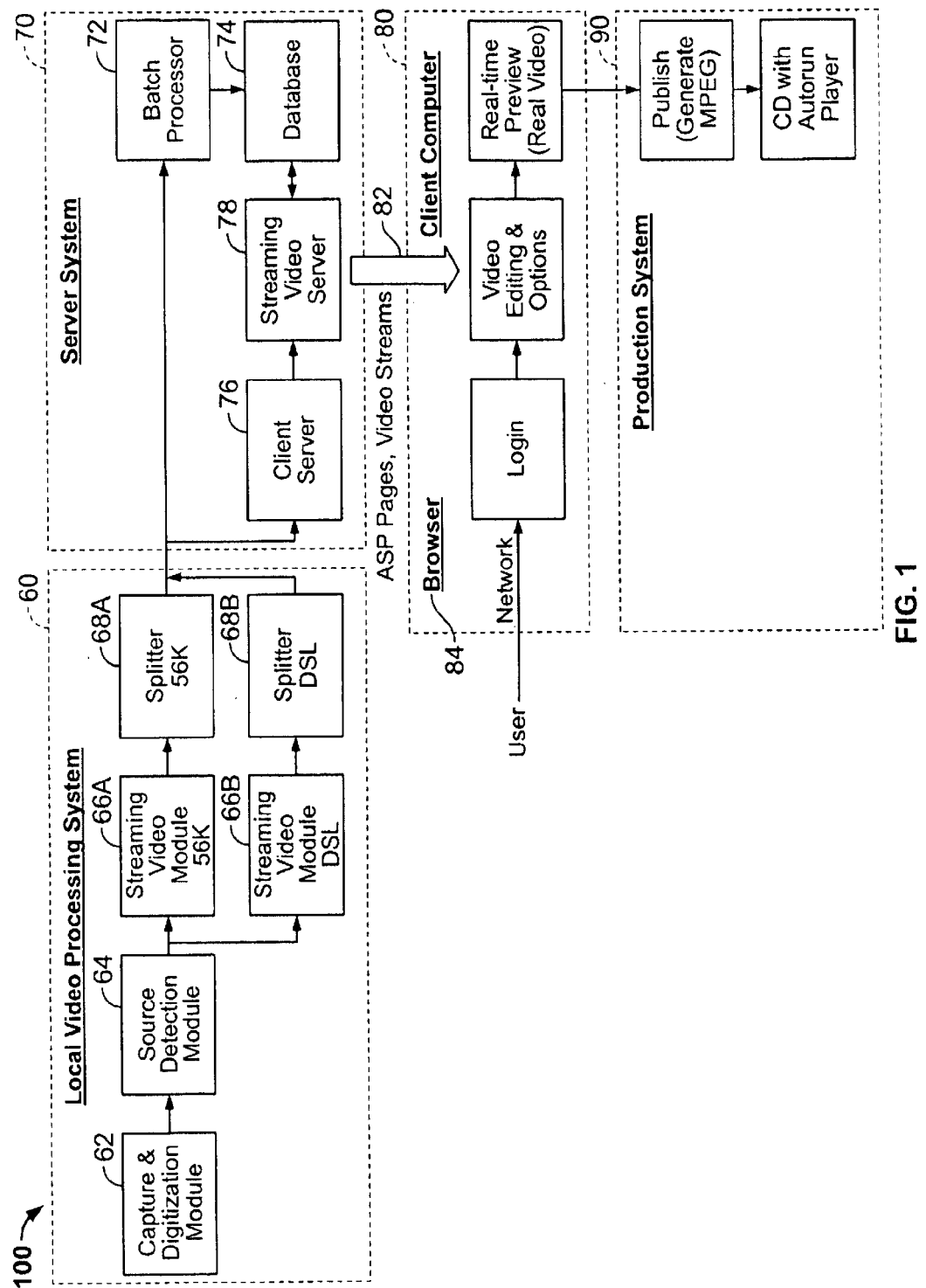
FIG. 1 is a schematic block diagram of a system for capturing, editing and distributing video content.

Referring now to FIG. 1, a system 100 is shown for capturing, editing and distributing video content. The system 100 includes a local video processing system 60 and server system 70. Local video processing system 60 captures and digitizes content and provides digitized video to server system 70. Server system 70 maintains a database 74 of digitized video and one or more servers. Database 74 may itself be a database server that includes one or more storage means for storing streaming and high resolution video and other data. The servers execute one or more applications to host video editing services as will be described in greater detail below. Server system 70 includes a website that can be accessed to retrieve, manipulate, order and distribute digitized video to one or more distributees. The details of the website, editing tools and distribution services provided by server system 70 is described in greater detail below.

Server system 70 can be linked to by a user using a client computer 80 via a network 82 (e.g., the Internet). The user can login, review and edit video that has been captured, combine the captured/edited content with other media and preview the results (i.e., a storyboard) in real time. For the purposes of these discussions, a "storyboard" is a working area presented by a user interface provided by server system 70 to the user operating client computer 80. One or more scenes are added to the storyboard as the user develops a finished product referred to as an album. An album includes a name and a representative still. Albums can be edited and eventually published. Publication can include the creation of a high resolution version of the digitized content and may include the production of a physical manifestation of the digitized content (physical media) for distribution to one or more distributees. Alternatively, an album can be published on-line and viewed by others in a streaming format.

In one implementation, the user can view a streaming video version of the digitized content stored in the database 74 in server system 70. Streaming video server 78 can download to the user via the network 82 a streaming version of a scene, storyboard or album. The streaming video version can be a low resolution version of the original digitized content stored in the database 74. After the user has reviewed and/or modified a storyboard, the user can use a browser to order a physical manifestation of the storyboard/album. The user can also allow others to access an album or distribute multiple copies of the physical manifestation to other distributees. The processes invoked by the browser are described in greater detail below.

System 100 includes a production system 90 that is used to produce a published version of a selected album as well as produce the physical manifestations of the album for distribution to the distributees. The published version of the album can be a high resolution, streaming or other version of the original digitized video content that is stored in the database 74 of the server system 70. In addition to the delivery of a physical manifestation of the digitized content, an information stream can be produced to deliver a version of the content to the distributees. The information stream can be delivered by a delivery system such as the World Wide Web using an internet enabled set top box (using the file transfer protocol ftp), DVD player or personal computer, a cable system incorporating a video-on-demand set top box, or satellite system (satellite narrowcast). These and other delivery systems can be used to deliver a streaming version of the digitized content.

Local Video Processing System

Local video processing system 60 includes a capture and digitization module 62, a scene detection module 64, one or more streaming video processors 66, splitters 68 and local storage 69 (not shown).

Figure 2A:
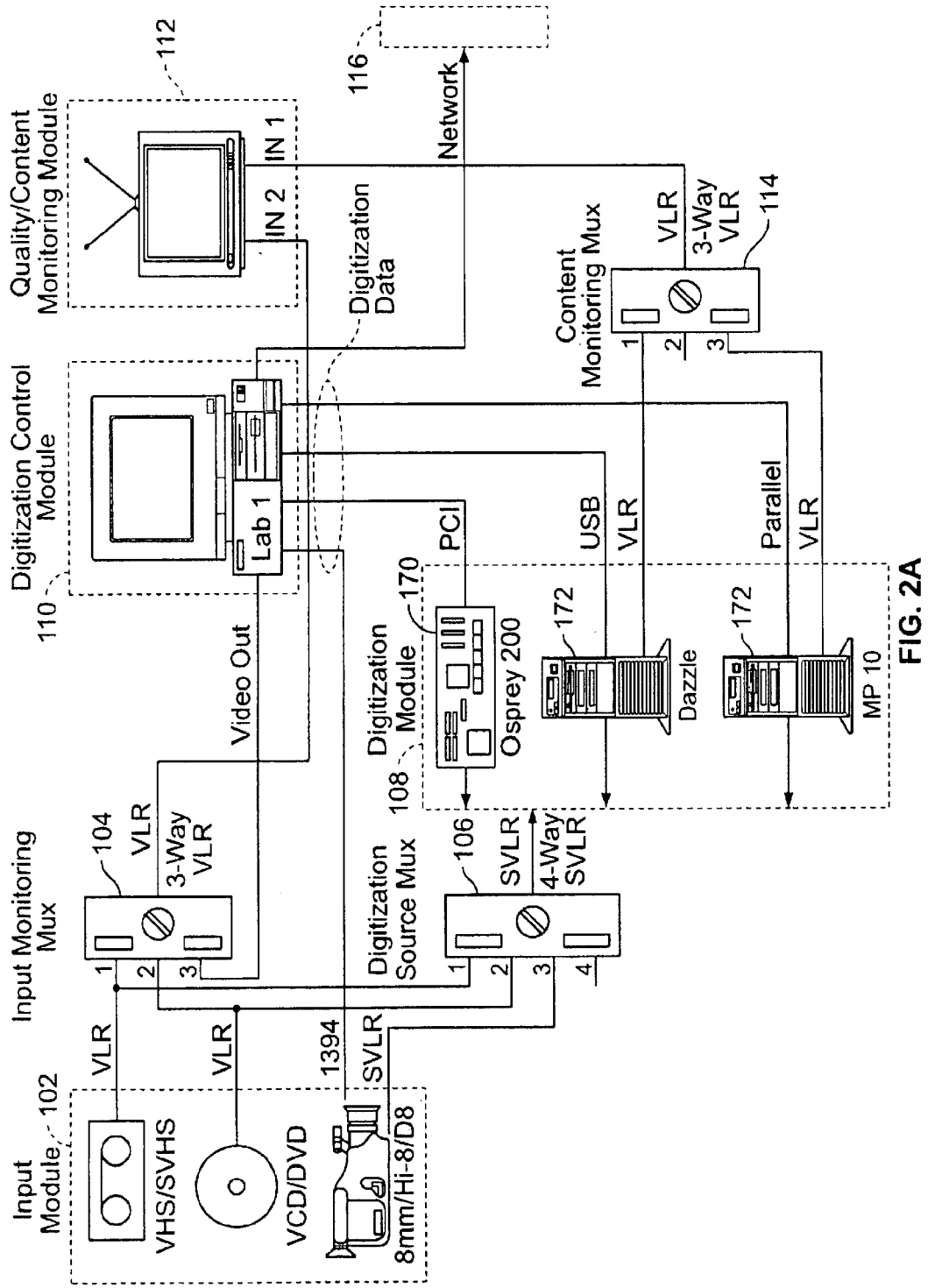
FIG. 2a is a block diagram of a capture and digitization module.

Referring now to FIG. 2*a*, capture and digitization module 62 includes an input module 102, an input monitoring multiplexor 104, a digitization source multiplexor 106, a digitization module 108, a digitization control module 110, content monitoring module 112, content monitoring multiplexor 114 and network connection 116 for interfacing with a network (e.g., local area network (LAN), intranet, Internet) that couples the digitization module 62 and the rest of the local video processing system 60.

Input module 102 includes plural means for reading input received from a user. Input can be received from a user by US Mail, delivery (e.g., FedEx, UPS), through a designated receiving site (e.g., a drop off center, kiosk, photo shop), or can be uploaded directly by the user. Input can be analog or digital. If the input has already been digitized, then the input can be provided directly to digitization control module 110. Otherwise, all other forms of input are digitized using digitization module 108. In one implementation, input module 102 includes a video cassette player (VHS, SVHS or 8 mm format), a compact disc player (video compact disc (VCD) and digital video compact disc (DVD)) and a camcorder for reading input. Input can be of the form of analog or digital tape (VHS, SVHS or 8 mm tape), VCDs, DVDs or direct input from a video recording device such as a 8 mm HI-8 camcorder. Input module 102 provides as an output plural input streams, one from each input device, that can be passed to both the input monitoring multiplexor 104 and digitization source multiplexor 106. Alternatively, the input module input stream can be coupled directly to the digitization control module using a Fire Wire connection (IEEE-1394 interface) or other direct input means.

Input monitoring multiplexor 104 receives as inputs a video stream on each of its input ports and provides a single selected stream as an output on its output port. In one implementation, input monitoring multiplexor 104 receives as inputs two video streams from the input module (a stream from a video cassette player and the compact disc player) and a feedback stream from the digitization control module 110. The output of the input monitoring multiplexor 104 is coupled to an input of the content monitoring module 112. In this way, the video output from each input device can be viewed by a quality control monitor for the system.

Digitization source multiplexor 106 receives as inputs video streams on each of its input ports and provides a single selected stream as an output on its output port. In one implementation, digitization source multiplexor 106 receives as input three video streams from the input module (one from each of the video cassette player, compact disc player and camcorder). The output of the digitization source multiplexor 106 is coupled to the input of digitization module 108. In this way, the video output stream from each input device can be selected for digitization by the digitization module 108.

Digitization module 108 can include plural devices for digitizing the video input received from the input module 102. In one implementation, digitization module includes a controller 170 (e.g., an Osprey 200 video capture card available from ViewCast.com), and two digitizers 172 (a Digital Video Creator available from Dazzle Multimedia and Studio MP10 available from Pinnacle Systems). Each device (controller 170 and digitizers 172) is coupled by a bi-directional communications bus to the digitization control module 110. In one implementation, controller 170 is included as part of digitization control module 110.

Digitization control module 110 controls the configuration and selection of the devices in the digitization module 108. Depending on the configuration, one or more of the devices will operate on the video stream received from the digitization source multiplexor 106 and provide output to both the content monitoring multiplexor 114 and the digitization control module 110. In one implementation, each digitizer 172 provides a digitized stream that contains the digitized video as an output to the digitization control module 110. In addition, the digitized content can be rendered to produce a video stream that is provided as an output to content monitoring multiplexor 114.

Digitization control module 110 can also perform a synchronization function for the data transfers between the digitization module 108 and input module 102. Digitization control module 110 can activate input module 102 and digitization module 108 in an appropriate sequence so that output of input module 102 can feed into the input of digitization module 108 without any human intervention.

Content monitoring multiplexor 114 receives as inputs a video stream on each of its input ports and provides a single selected stream as an output on its output port. In one implementation, content monitoring multiplexor 114 receives as inputs two video streams from the digitization module (a stream from each digitizer 172). The output of the content monitoring multiplexor 114 is coupled to an second input of the content monitoring module 112. In this way, the video output from each digitizer 172 can be viewed by a quality control monitor for the system.

Content monitoring module 112 includes a video monitor for viewing video streams processed by the system 100. In one implementation, the content monitoring module 112 includes two inputs, one from the digitization module 108 and one from the input module 102 (via their respective multiplexors).

Digitization control module 110 controls the operation of the digitization module 108. Digitization control module 110 receives as an input a digitized video stream that can be manipulated for further processing. Digitization control module 110 associates with each processed digitized stream a video identifier (ID) associated with the source (user) of the input. The output from digitization control module 110 (a digitized video stream) is coupled by network connection 116 to remaining portions of the local video processing system 60. In one implementation, the digitized video stream is encoded prior to output. In one implementation, the output format is an MPEG format.

In one implementation, digitization control module 110 can add information to the digitized video prior to transfer to the remaining portion of the local video processing system 60. For example, production screens or customized title screens can be added to the digitized video to indicate the source of origin of the digitization services.

The digitized content produced in the local video processing system 60 can be stored locally in local storage 69 on disc or other physical media.

I. Scene Detection

Referring again to FIG. 1, scene detection module 64 includes an algorithm for detecting scene changes in the digitized video. Scene detection module 62 receives as an input the digitized stream from the capture and digitization module 64 (e.g., the MPEG file) and provides as an output scene information. In one implementation, the scene information includes scene identification information, bad video segment information as well as a representative still image for the scene. In one implementation, the scene detection module 64 provides as an output a JPEG still for each scene.

Figure 2B:
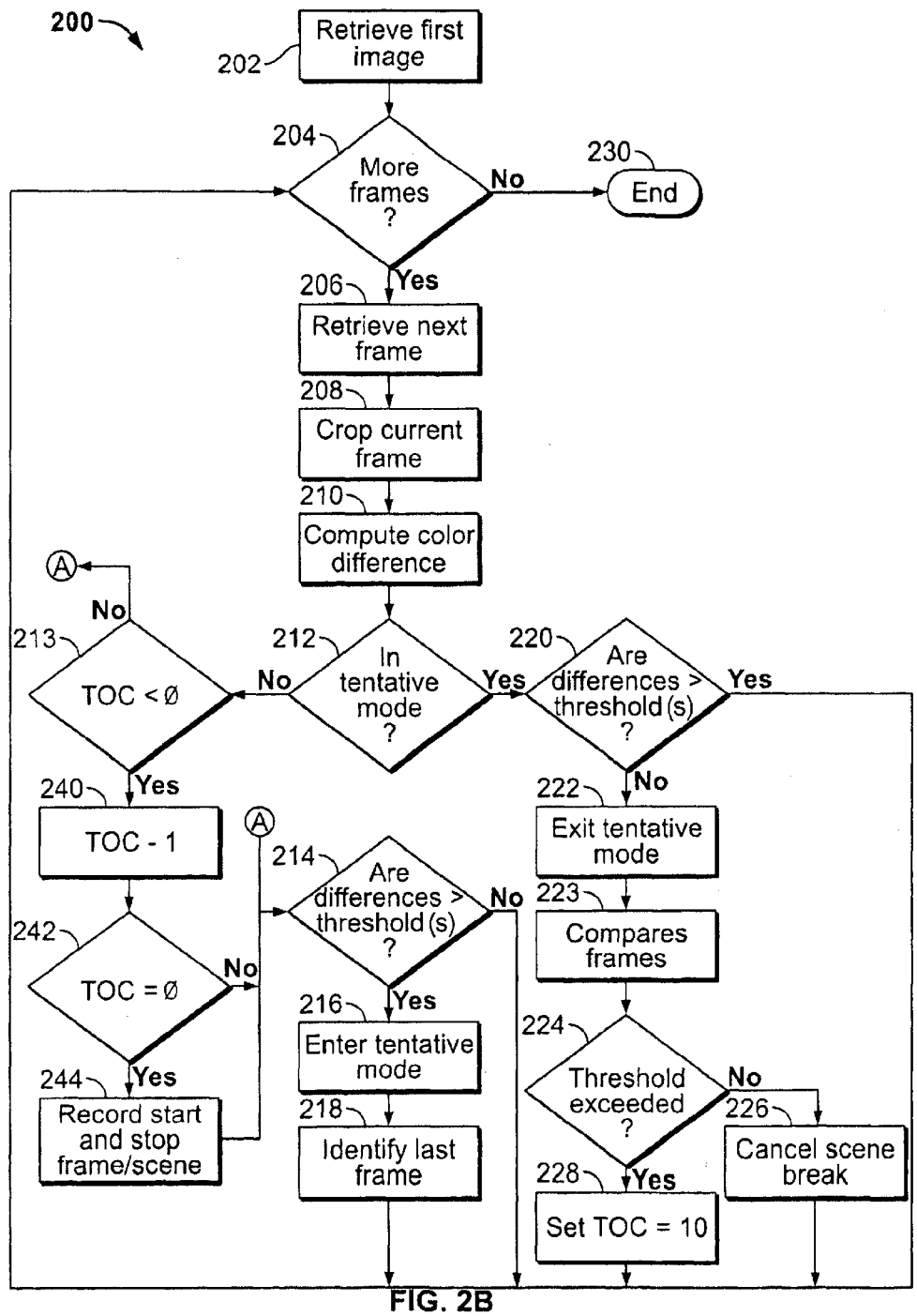
FIG. 2b is flow diagram for a method for detecting scenes in a digitized video.

Referring now to FIG. 2b, a method 200 invoked by the scene detection module 64 for detecting scenes in the digitized content is shown. The method 200 is used to detect when the video camera was turned on or off (i.e., a scene break). The output of the method is a list of segments, where each segment contains beginning and end frame numbers. The method begins by retrieving a first image frame (202). If no more frames are to be processed (204), the process ends (230). Else, the next image frame is retrieved (206). The current image frame is cropped (208). The image frame is cropped to include only the interior portion of the image area since the outside boundary may contain camera noise. Where the image frame dimensions are W×H, the method only considers pixels within the rectangle (bw,bh)–(W–bw, H–bh). In one implementation, bw is set to 0.1*W and bh is set to 0*H.

Thereafter, a color difference and a motion difference between the current image frame and the previous one is computed (210). A check is made to determine if the method is in the "tentative" mode (212). If not, another check is made to determine if a time-out counter (TOC) is non-zero (213). If not the process continues at step 214. If the TOC is non-zero, then the TOC is decremented by one unit (240). If, after decrementing, the TOC is now zero (242), the method declares a true scene break and records a frame identifier associated with the frame located previously (in step 218) as the end of a scene and the next frame identifier as the start of the next (new) scene in the list of scenes (244). Thereafter, or if the result of the comparison in step 242 is non-zero, the process continues at step 214.

In step 214, the motion and color differences are compared to preset thresholds. If both the motion and the color differences are not above the preset threshold(s), then the process continues at step 204. If both the motion and the color differences are above the preset thresholds, then a possible scene break has been detected and the method enters the tentative mode (216). The tentative mode is defined as a time period after detecting an initial indication of a scene break over which the frame-to-frame motion and/or color difference continues to exceed the threshold(s). In one implementation, the thresholds are determined by performing a regression analysis on a database of home camcorder footage. The image frame immediately before the detected break is identified (218) and the process continues at step 204.

If the method is already in the tentative mode, then a check is made to determine if both the motion and the color difference are above preset thresholds (for the identified frame and the current frame) (220). If so, then the method switches back to the "normal mode" (exits tentative mode (222)) and then compares the frame identified in step 218 with the current flame (223). The comparison includes the computation of the color and motion differences between the two frames and a comparison of the results to a preset threshold(s). If the differences do not exceed the threshold(s) 224, then the tentative scene break is cancelled (including deleting the scene identified in step 218) (226) and the method continues at step 204. If the differences exceed the thresholds, then the TOC counter is initialized to a preset value 228. At this point, the method has detected a true scene break, but will wait for a number of frames equal to the initial time out value before declaring a scene break. This waiting period can be used to detect another scene break (within the time-out period) which has an even larger motion and color difference. Thereafter, the process continues at step 204.

In home camcorder footage, camera flashes and fast motions (e.g. someone walks in front of a camera) can often cause color and motion differences to exceed the preset thresholds for a short period of time. In order to reduce these false positives, the system includes the tentative mode. While in the tentative mode, the system compares new image frames to the previously stored image frame (identified in step 218) for a timeout period. In one implementation, the timeout value is determined to be ⅓ of a second. If by the end of the timeout, the image is still very different from the stored image, the system declares the detected scene break to be a true scene break and turns off tentative mode.

A. Computing Color Difference

There are many standard ways of computing color differences. In one implementation, the system first computes a 2D color histogram of the image frame. The two color axes are used to compute a representative color model of the image frame. The two axes are normalized red ($r'=r/r+g+b$) and normalized green ($g'=g/r+g+b$). Thereafter, the system creates a 2D array, H, where each bin, $H(r',g')$, represents a rectangular region in normalized red and green space. Each bin is initially set to zero. For each pixel in the image, the pixel's normalized color values ($r',g'$) are computed and the count in $H(r',g')$ is incremented by one.

The actual color difference is computed by comparing the histogram for the current image frame and the previous image frame (or identified image frame). The color difference between the two image frames is the histogram intersection: the system accumulates, for each bin location in each histogram, the count of the smaller of the two bins [$CD=sum(min(H1(i,j),H2(i,j)))/N$ where I and j are indexed over all the bins in the histogram and where N is the total number of pixels in the image frame].

B. Computing Motion Difference

There are many standard ways of computing motion difference. In one implementation, the system computes a motion difference by calculating the total number of pixels that have changed significantly between the two images. The system uses the intensity value of each pixel $I(x,y)$ to do the comparison. Let $m(x,y)=1$ if $|I1(x,y)-I2(x,y)|>threshold$, 0 otherwise. Then the motion difference $MD=sum(m(x,y))$.

C. Extracting Representative Frames

In one implementation, the process for selecting a representative still for a scene includes picking the first frame of the scene. Although this strategy works very well for professionally produced footage, it does not work well for home camcorder footage. The first few frames of home footage often contain garbage because the person has not quite set up the shot yet. In one implementation, a better choice for the representative frame is selected by analyzing the entire segment and selecting an image that best approximates the rest of the segment. In one implementation, the system restricts this representative image to be within the first few seconds of the scene (the "segment intro").

To select a better representative frame, the system computes a color model of the entire scene by computing the average color histogram of the entire scene. This average histogram is compared with every image in the segment intro using histogram intersection (see previous discussion). The image frame with the smallest color difference is chosen.

In one implementation, a one pass algorithm is used to extract the representative frames while the scene break detection is going on. As soon as a new scene is detected, all the successive images in the segment intro (usually 5 seconds=150 frames) are stored in a buffer. In addition, the system keeps track of the running sum of all the bins in the histogram. When the end of the segment is detected, the system computes the average histogram by dividing each bin by the total number of images. This average histogram is compared against the frames in the buffer. The best match is selected and output as the representative frame. In one implementation, a slight trick is used due to the timeout period. More specifically, the system does not know that a scene has been detected until a timeout (e.g., ⅓ of a second) after the break was initially processed. The system maintains a second additional buffer sized in accordance with the timeout period (e.g., ⅓ second=10 frames for a 30 fps video segment) to make sure the system does not miss any frames.

D. Bad Video Segment Detection

Home camcorder footage often includes segments in which there is not a valid video signal on the tape. This can occur if the lens cap is left on while recording, if the tape is accidentally fast forwarded during filming (leaving an unrecorded portion of the tape) or by other means. The most common cause of this problem occurs when a tape is removed before it has been filled to 100% of capacity producing a tape that includes a final segment with no video signal.

In order to automatically detect and remove such bad video segments, the system can perform an analysis on the representative still selected for each segment and remove those segments that do not have a valid video signal. This of course assumes that if the representative still has a valid signal, then the remainder of the detected segment will also have a valid signal. Since the representative frame is by definition the frame that best represents the entire segment, then this assumption is very good in practice.

To determine whether or not the representative still has a valid video signal, the system computes statistics on each of the color channels (e.g., three in an RGB device) and compare then to preset thresholds. In one implementation, the system computes the standard deviation of the red, green and blue color components [for example for the red component: $StdDevR = sum((Rk-avgR)*(Rk-AvgR))/N$, where AvgR Is the average value of the red component throughout the image, N is the total number of pixels in the image and Rk is the value of the red component of the kth pixel in the image, where k ranges from 0 to N−1.]

The system then checks to see if the standard deviation computed is less than a threshold [e.g. $StdDevR < ThresholdR$.] If so, then the still image is labeled a bad image and the associated segment is labeled a bad segment (e.g., scene). In one implementation, the threshold values are determined by performing a regression analysis on a database of home camcorder footage.

In an alternative approach, a check can be made of each image (still) in a segment. When the color statistics for each frame exactly match, a bad segment is declared.

Referring again to FIG. 1, after the scene detection process has been performed, the digitized video (e.g., MPEG file) and scene detection information (e.g. scene identifiers and JPEG stills) are provided to streaming video processor (s) 66 and splitter 68. Streaming video processor 66 operates on the digitized video to produce a streaming version (encoded version) that can be easily downloaded or viewed over a network (e.g., the Internet). In one implementation, two parallel streaming processors 66a and 66b are provided that produce streaming video output streams at two resolutions and bit rates. Streaming video processor 66a provides a streaming video output for supporting a 56 k modem configuration while streaming video processor 66b provides a streaming video output for supporting a digital subscriber line (DSL) configuration. In one implementation, video output processor 66 outputs a RealVideo format file and any accompanying SMIL files necessary for previewing the RealVideo format file by the user.

The output of video processor 66 is provided as an input to splitter 68. Splitter 68 takes the scene detection information and produces individual encoded files, one for each scene. The output of the splitter 68 is provided as an input to server system 70. In one implementation, two parallel splitters 68a and 68b are provided that produce encoded output files at two resolutions and bit rates. Splitter 68a provides as an output scene-based encoded files to support a 56 k modem configuration while splitter 68b provides as an output scene-based encoded files to support a DSL configuration. In one implementation, splitter 68 outputs RealVideo format file(s) and any accompanying SMIL files necessary for previewing the RealVideo format file by the user.

Server System

Server system 70 includes a batch processor 72, a database 74, a client server 76 and streaming video server 78.

Batch processor 72 receives as an input encoded (e.g., scene-detected RealVideo files) and digitized video files (e.g., the digitized MPEG file) from local video processing system 60. The connection between server system 70 and local video processing system 60 can be optimized to support needed bandwidth and cost structure. In one implementation, the connection between the devices is a high-speed T1 link. In another implementation, this connection is a physical device such as a removable hard disc or a Iomega, Inc. Jazz disc. Batch processor 72 writes all of the information associated with the files to the database 74 and copies all files into an appropriate directory structure. In one implementation, all files associated with a digitized video are stored in a single directory associated with the user's ID. Other directory structures can be used.

Client server 76 receives notice from batch processor 72 when the data transfer to the database 72 has been completed and the video content is available for processing. Client server 76 includes plural applications for interfacing with the user and the various other system components. In one implementation, client server 76 includes an E-mail application that can be invoked to send notification to the user that the digitized video is available for review.

Client server 76 hosts a website that can be visited by the user. Client server 76 is connected to one or more client computers 80 by a network 82 such as the Internet. Client server 76 includes a web front end (not shown) that manages the communications with the client computers 80. The website can include plural applications that when executed allow the user to view, edit, manipulate, archive and order copies of the digitized content. The website architecture and user interface are described in greater detail below.

In one implementation, the user can view a streaming video version of the digitized content stored in the database 74 in server system 70. Streaming video server 78 can download to the user via the network 82 a streaming version of a scene, storyboard or album. The streaming video version can be a low resolution version of the original digitized content stored in the database 74.

In one implementation, the video material is stored for predefined length of time at server system 70. In one implementation, server system 70 sends E-mails at 10 and 14 days that warn of imminent deletion of material.

Ultimately, material can be deleted after a pre-defined period (e.g., 21 days). Any in-process albums will be altered to remove the deleted material. An E-mail can be sent after deletion that informs the user how to send in an archive CD for reposting of material.

Client Computer

The client computers 80 can be connected to various input devices (digital video camera, digital still camera and storage means) so that a user can upload captured digital images, video clips or previously digitized video scenes to the client computer 80. Alternatively, or in addition, the client computer 80 can execute digital video processing software such as Ulead Video Studio3.0 SE or image processing software such as ADOBE PHOTOSHOP® in order to create and/or edit digital video or still images. The client computer 80 includes a storage medium (not shown) such as a hard disk for storing the digital video or still images.

The client computer 80 is connected to the network 82, for example, using a modem or network interface card. The system can be implemented as a browser-based system in accordance with the standard protocols for communicating over the Word Wide Web. In such an implementation, a user of the client computer 80 can execute a browser 84 to connect to and interact with the client server 76. As described above, client server 76 includes a web front end that manages the communications with the client computer 80. The user of the client computer 80 can upload digital content to the client server 76. The web front end receives the uploaded digital content and stores the content in database 74.

Production System

The user of the client computer 80 can also order content made from edited or raw content as will be described in greater detail below. The client server 76 includes or is connected to a production system 90. Production system 90 receives the selected digitized content from the client server 76 and generates a physical manifestation (e.g. DVD or CD) of the content from the selected digitized content. Alternatively, the production system receives an edit list that identifies the content to be processed and the content is retrieved from the database 74 (e.g., from the database server). The items generated by the production system 90 can be shipped to the user using a conventional shipping service such as the United States Postal Service or Federal Express.

In one implementation, the production system includes a user interface that is presented to the user to allow for a one click publication process. The user interface can include for example a finished button (563 of FIG. 5b) that automatically publishes a finished album. The automatic publication process includes the generation of scenes, high resolution content, streaming content, contact sheets and other materials for inclusion in a finished product. The publication services are described in greater detail below.

In one implementation, the CDs produced by production system 90 can be archived or otherwise backed up to allow for high quality content to be available for later derivative work.

In one implementation the product shipped (CD) includes the high resolution video (e.g., MPEG files), a Media Player and an auto play file. In another implementation, a streaming version of the selected content is also included in the shipped product.

A contact sheet can be created and printed for inclusion with the product. After the scene detection process has been completed, a contact sheet can be generated. The contact sheet is a sheet (e.g. of paper) that contains a number N of thumb-nail sized key frame images (stills) representing the detected segments of the input video as well as the movie times associated with each key frame. In one implementation, the maximum number of thumbnails is 30. When generating the contact sheet, two distinct special cases are considered, when the number of detected segments M is greater than N, and a when the number of detected segments is less than N.

In one implementation, when presented with the first case where M>N and more segments are detected than can be printed on a single sheet, only the first N thumbnails are printed on the sheet.

In the second case where the N>M, then an algorithm can be selected to fill up the sheet. In one implementation, the algorithm selects a longest segment, divides the segment into equal pieces and selects new representative stills for the segments (as necessary). Alternatively, only a subset of the stills can be printed. In one implementation, the selection of the number of stills to printed on the contact sheet does not affect the underlying digitized content (i.e., no new scene breaks are established due to the division).

After the key flames are selected, the images can be added to a digital image representative of the contact sheet, and subsequently printed. The album author's name, title, and date of creation can also be added to the digital image prior to printing.

Figure 6:
FIG. 6 shows a user interface for a media player.

A new set of scenes associated with the published product can be included. A user can click on a scene and the video segment corresponding to that scene will be played immediately. Other features include an A-B playback loop and random/shuffle play options. A user interface for a media player associated with the final product is shown in FIG. 6 Labels are printed and attached to the product (CD and jewel case) that include the title of the album or content included. In one implementation, the product (e.g. CD) and contact sheet, along with the original tape (if any), are sent to the user.

Album CDs may be ordered via E-mail, phone, and mail. Upon receipt of payment within the appropriate time period the product is shipped as described above. Multiple products (e.g., CDs) may be shipped to multiple addresses.

Process for Ordering Video Products

Figure 3:
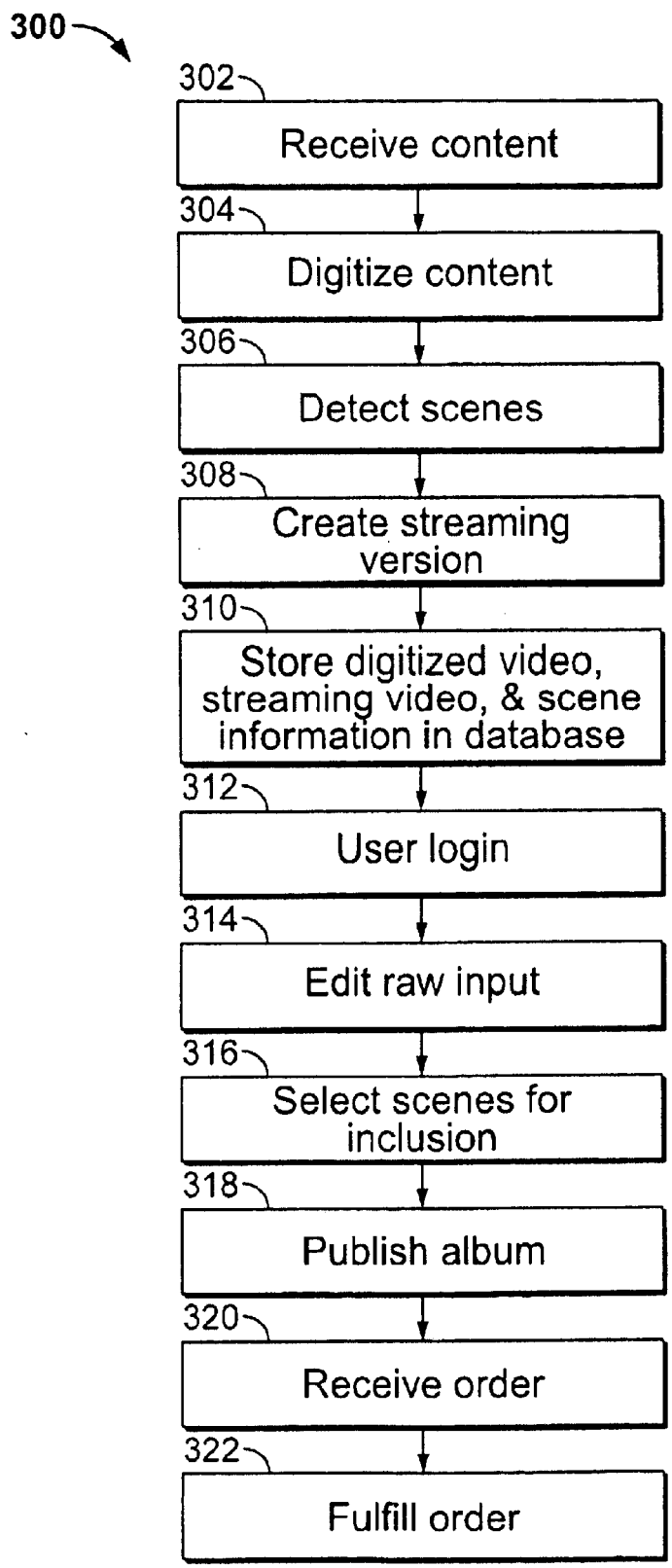
FIG. 3 is a flow diagram of a high-level process for offering digitized video products for sale over a computer network such as the Internet.

FIG. 3 is a flow diagram of a high-level process 300 of offering digitized video products for sale over a computer network such as the Internet. First, content is received (block 302). For example, a user can send an 8 mm tape for processing to the local video processing system 60. The content is digitized (304) and a scene detection process is invoked (306). In one implementation, a user executing a browser on the client computer 80 can access the web front end of the client server 76 and upload a digitized video or other digital content directly to the client server 76 bypassing the local video processing system 60. In this implementation, the client server either invokes a local scene detection process or forwards the digitized video that is received to the local video processing system 60 for scene detection services. Alternatively, the user can upload or otherwise send material that has been previously digitized by the local video processing system (e.g., a published CD). The material is reposted to the web site after which it is handled as if it had just been digitized by the local video processing system 60.

Then, the local video processing system 60 operates on the digitized video to produce one or more encoded streaming versions of the digitized video (308). The digitized video, scene detection information and encoded streaming versions of the digitized video are then stored in database 74 accessible by client server 76 (310).

The web front end of the client server 76 can be configured to allow the user to view scenes stored in the database 74 and select one or more scenes for subsequent processing or inclusion in an album as described below. More specifically, the user logs in to the website using a video identifier for the content that was previously provided as part of block 302 (312).

Figure 4A:
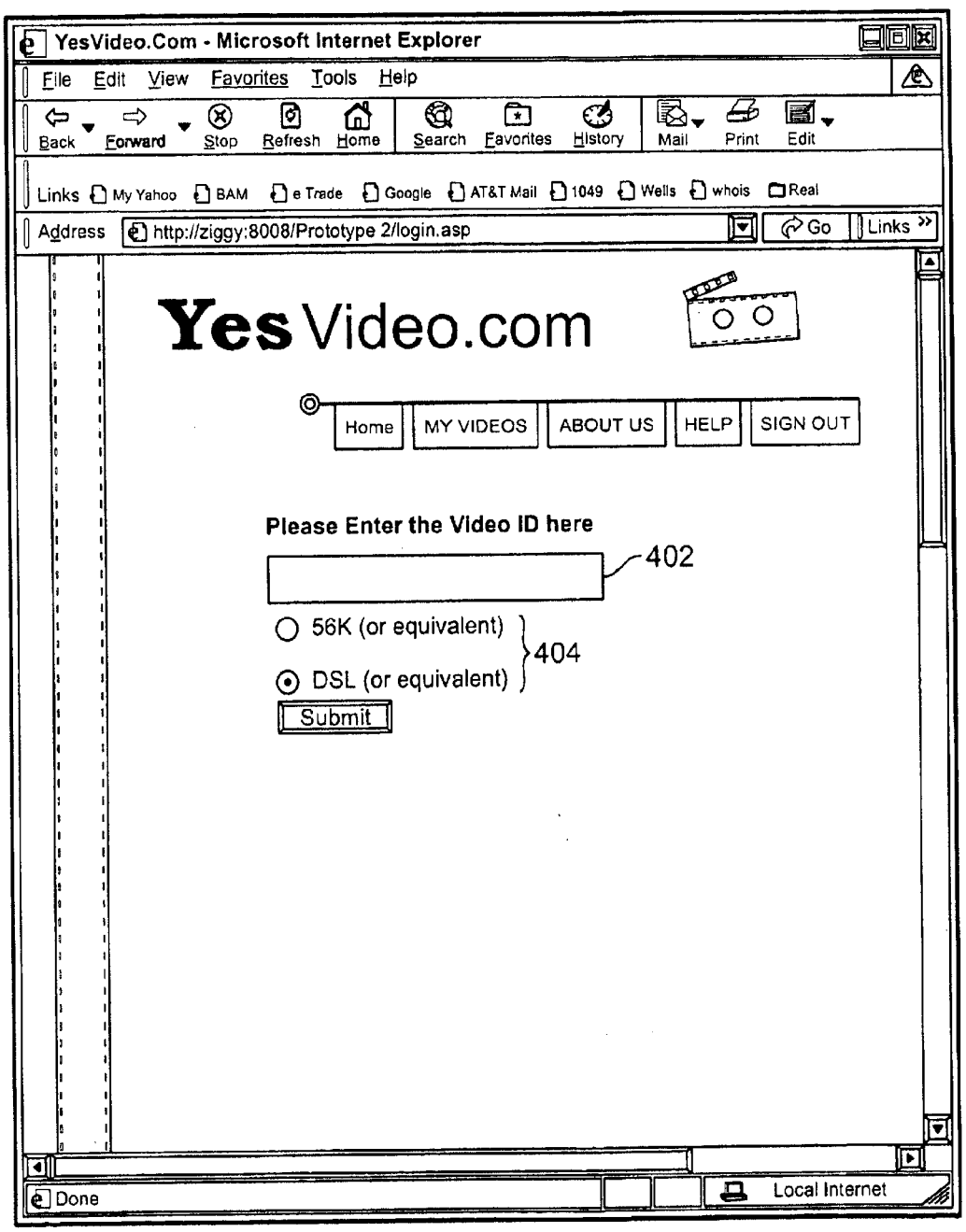
FIG. 4a shows a user interface for a login screen.

FIG. 4*a* shows one example of a user interface (i.e., the "login page") 400 presented to the user of client computer 80 for accessing digitized video stored at server system 70. The login includes a video identifier (ID) box 402 for indicating the identifier for the video product that is to be edited/viewed. When a user uploads or otherwise delivers the video content to the system, a video ID is assigned. The video ID is a unique identifier to a particular product. In one implementation, the video ID may be required to be accompanied with a password for security purposes. In addition, the login page includes an interface specification checkbox 404 for specifying the connection type for the current session. The first time a user logs in they are presented with a wizard (not shown) that gathers basic information including preferred bit stream (required) and other information about them. Information that the customer specifies can be changed later through a preferences page (not shown). On subsequent logins, a user may request that their password be reset to the default or a reminder sent to them. The default password can be the last four digits of the customer's home phone number.

After finishing the wizard or after a successful login, the user is redirected to an appropriate page. If a video ID is provided, the user may be directly presented an editing page for the selected video. Alternatively, the user may be presented with a start page as described below, from which the user can select a video for editing. Once selected, the user can edit the raw input (314), select scenes for inclusion in an album (316) and publish the album (318). The publication of the album includes the creation of a high resolution copy of the selected content (or a streaming version). Next, an order is received for the published album (320). For example, the order can be received by the web front end from the user's client computer 80. The order can be received in other ways including, for example, via electronic mail, Internet Relay Chat, the telephone, and/or the mail. Typically, the order will include information specifying (or otherwise referring or pointing to) a type of product, the published album to incorporate into the product, a quantity of the product being ordered, payment information, and delivery information. After the order has been received, the order is fulfilled (322). For example, the order can be fulfilled by burning or otherwise generating the product (e.g. the DVD or CD) and delivering the product to the customer.

Figure 4B:
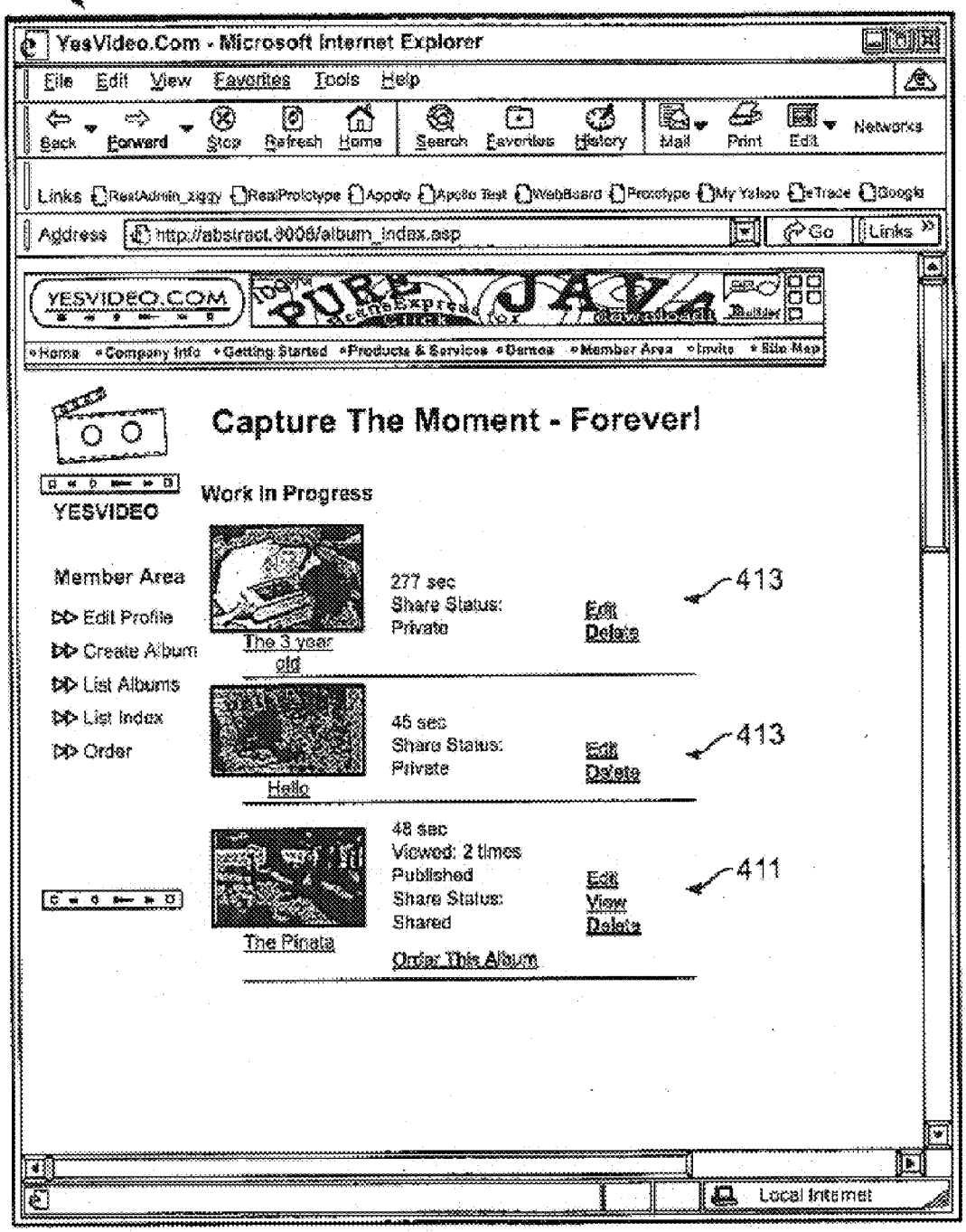
FIG. 4b shows a use interface for a start page.

Referring to FIG. 4*b*, a user interface 410 presented by server system 70 for a start page is shown. The start page includes links to Published Albums (finished albums 411), Unfinished Albums 413, and can include an Inbox (raw material) pages for recently uploaded content. On each start page published albums are listed. Displayed are the title, description, first key frame (representative thumbnail still), and length of each album. By clicking on a key frame a viewer can see a streaming video (e.g., Real Video) version of the associated album. In one implementation, the key frames are at least 80×60 pixels. On each start page appears a list of videos that are available for editing. Title or ID, number of scenes, and length are displayed as a link that leads to an editing page for that video. By clicking on the video or by selecting an edit button, the user is taken to an editing page for the selected video. In addition, the user can directly order an album or delete an album by selecting an appropriate button.

Figure 5A:
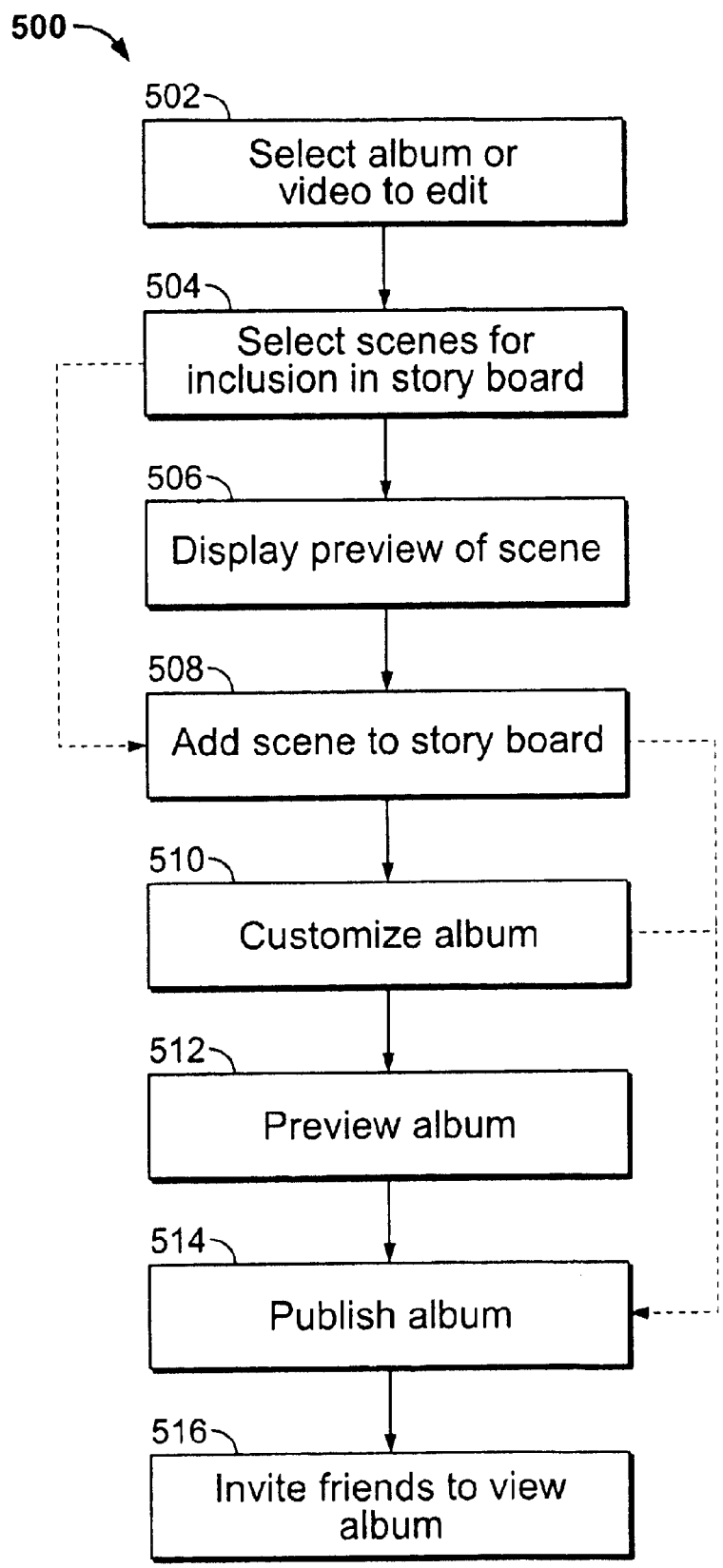
FIG. 5a is a flow diagram for a process for editing a video and creating an album.
Figure 5B:
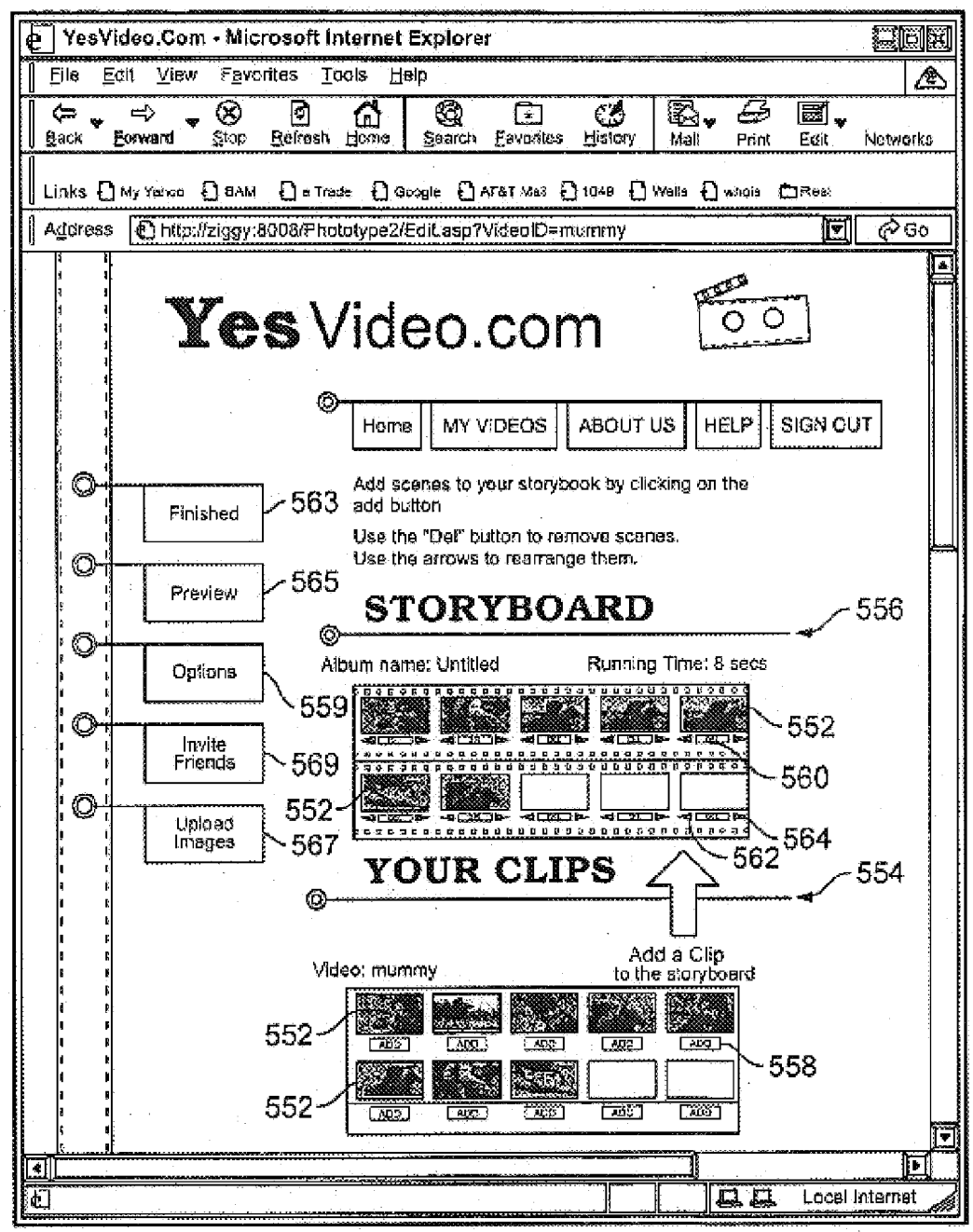
FIG. 5b shows a user interface for an editing page.

Referring now to FIG. 5*a*, a process 500 for editing a video and creating an album is shown. The process begins by selecting an unpublished album or video to be edited (502). When the selection is made from the start page or other page in the user interface, an storyboard edit page is presented. One example of a user interface 550 presented by server system 70 for a storyboard edit page is shown in FIG. 5*b*. On this page the video title or ID and length will be displayed along with a key frame (e.g., the individual JPEGs from a JPEGs directory in database 74) from each scene. Controls presented in conjunction with the storyboard edit page can be manipulated by a user to select a scene for subsequent processing or inclusion in an album. a plurality of representative "thumbnail" images for scenes stored in the image database 74 (also referred to here as "thumbnails" or key frames) are displayed in the user interface 550. The user interface includes two frames, one for clips (scenes) 554 and one for a storyboard 556. In one implementation, the clips frame 554 includes individual scenes associated with a single video ID (i.e. raw input scenes). Alternatively, the clip frame 554 can be used to display all of the scenes associates with a previously created album. Each scene includes a thumbnail 552.

The user can select ones of the scenes from the clip frame 554 for inclusion in the storyboard frame 556 (504). The user interface 550 can be configured in a conventional manner so that a user can select a particular scene for inclusion in a storyboard by clicking on the thumbnail 552 associated with that scene. In addition, or instead, the user interface 550 can include a plurality of buttons (or other user interface controls) associated with one or more scenes stored in the database 74; a user can click on (or otherwise actuate) one of the buttons in order to select the one or more scenes associated with that button. The selected scene is then retrieved from the database 74 and used for subsequent processing. The scene can be received and selected in other ways, including for example, as an attachment to an E-mail or embodied on a storage medium such as DVD or CD-ROM.

Once a scene is selected, then a preview of the scene can be displayed (506). As described above, when the digitized video is processed by the local video processing system 60, one or more encoded versions of the digitized video are created to allow for streaming video downloads to the user. Streaming video server 78 processes these requests and provides a streaming video preview of the selected scene. In one implementation, by clicking on a key frame on the editing page the user can view a RealVideo version of the selected scene. In one implementation, a Real Player module pops up, plays the scene, then disappears. Alternatively, the Real Player module pops up and plays just that scene but also displays the key frames for the other available scenes. In another implementation, the Real Player area is embedded in the editing page. Clicking on a key frame plays just that scene.

Figure 5C:
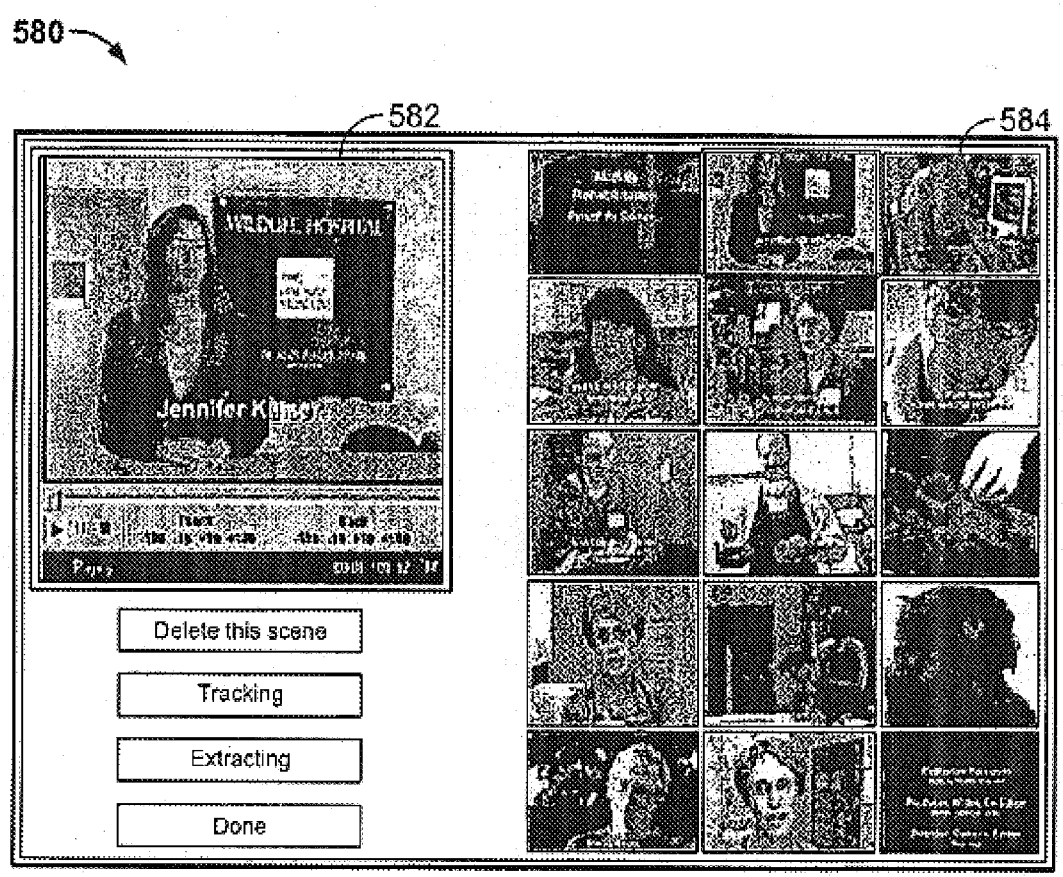
FIG. 5c shows a user interface for a preview page.

Referring to FIG. 5*c*, a user interface 580 presented by streaming video server 78 is shown. The user interface 580 includes a streaming video frame 582, scene frame 584 and one or more controls. The streaming video frame 582 displays the encoded video stream associated with the selected scene. The streaming video frame can include one or more controls for manipulating or otherwise editing the selected scene. For example, in one implementation, the streaming video frame 582 includes controls for cropping the selected frame to reduce the size/duration of the selected video clip. Scene frame 584 includes plural thumbnails 552 associated with the scenes presented in the clip frame of user interface 550. In one implementation, a new scene can be selected from the scene frame 584 and displayed in the video streaming frame 582 by the user selecting a desired scene. In one implementation, various controls are included on the user interface 580 for editing or otherwise managing the selected scene. Controls can include a tracking control for changing the video tracking, extraction control for selecting a frame or portion of a scene and a deletion control for deleting a scene from the clip frame 554.

At any time (either before or after preview), a scene can be selected to be added to the storyboard frame 556 (508). To do so, the user can actuate a control (add control 558) presented under a selected scene in the clip frame 554. The user can also deselect scenes included in the storyboard frame 556. To do so, the user can actuate a control (delete control 560) presented under a selected scene in the storyboard frame 556. In addition, the user can reorganize selected frames. To do so, the user can actuate a control (arrow control 562 and 564) presented under a selected scene in the clip frame 554.

Other content can be added to a storyboard. In one implementation, user interface 550 includes an upload button 567 that can be selected to upload other digital content (e.g., digital stills) or other scenes. By invoking the upload button 567, an upload page can be presented that includes raw scenes, or options for uploading other digital content from the client computer or server computer. A user can add scenes from more than one video to an album. In one implementation, the editing page will not allow a user to create an album that is longer in length than 60 minutes, as this is the maximum length that can be burned onto a conventional CD.

When the user has completed adding scenes to the storyboard frame 556, customized options can be included (510). Use interface 550 includes an options button 559 that can be selected by the user to customize an album. By clicking on this button, the user will be taken to a page where they can edit the title and description of the album, create a custom title screen, and set the security level of the album (private, shared, or public). If the album is designated as shared, the user may create or change a password associated with the album, or delete it. If the password or security level is changed on a published album, an E-mail can be sent to the user with album ID, password, and guest login instructions.

Figure 5D:
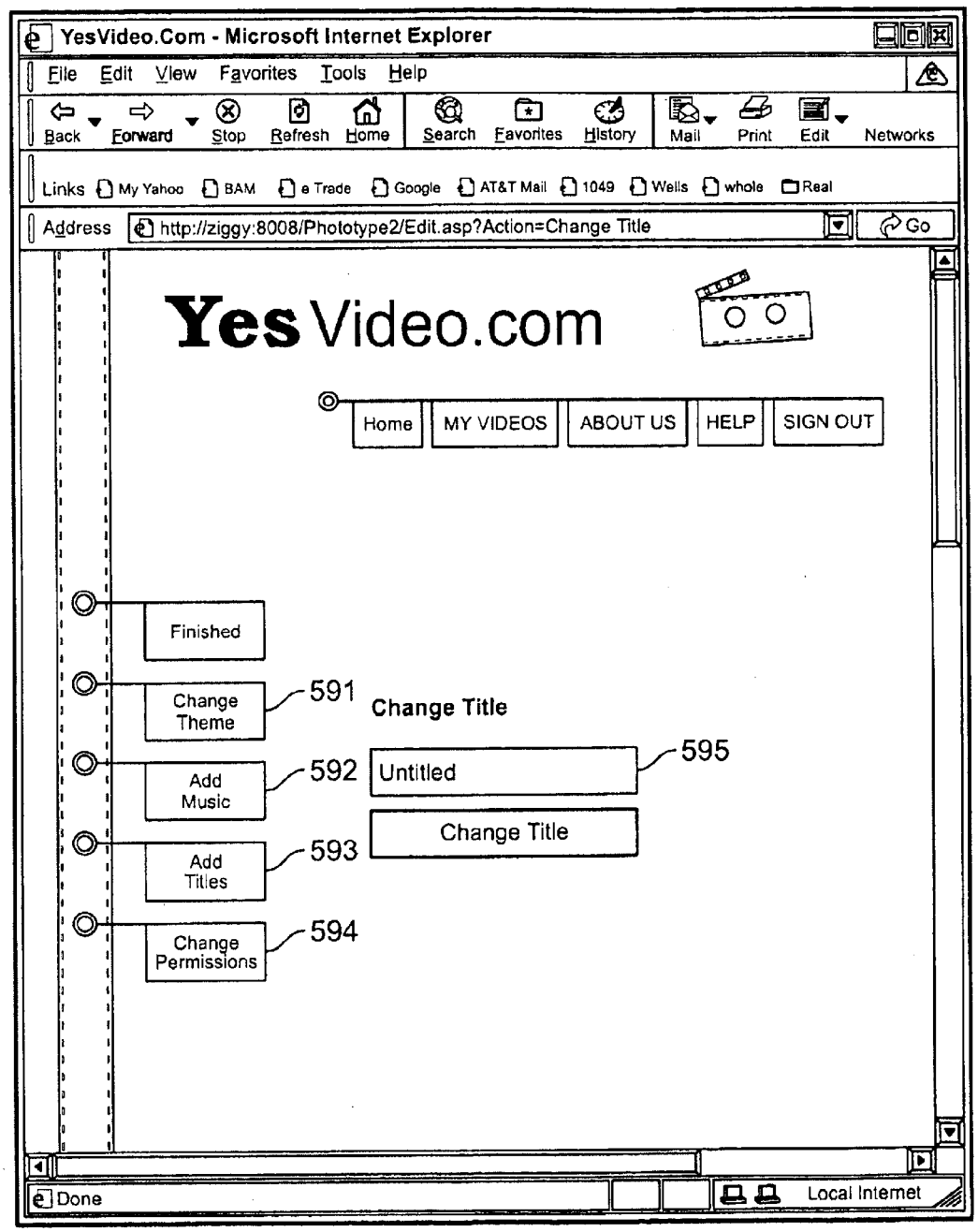
FIG. 5d shows a user interface for a options page.

A user interface 590 for an options page is shown in FIG. 5d. User interface 590 can include plural buttons for customizing the album. In the implementation shown, buttons include a change theme button 591, an add music button 592, an add titles button 593 and change permissions button 594. The change theme button 591 can be invoked by a user to add frames, artwork, borders, fonts or other stylized features to the album. The add music button 592 can be invoked by the user to add a music track to the album to be mixed with or supersede the existing audio track. The add titles button 593 can be invoked to add title pages to the album to introduce the album or individual scenes. The change permissions button 594 can be invoked to change the access rights to published albums. In addition, the user interface 590 can include a change title box 595 that can be used to change the title of the album.

After any customization has been added, the user can preview the album (512). In one implementation, the user can preview the album by selecting a preview button 565 on the user interface 550. The preview function includes the display of the entire album using the streaming video scenes that are selected for inclusion in the album. All title pages that are included are rendered and the entire finished product is displayed.

At any time, the user can publish the album indicating that the album is finished (514). The publication process includes the generation of a high resolution or streaming version of the storyboard and all included options. The high resolution version is stored in database 74. In one implementation, the user can publish the album by selecting a finish button 563 in the user interface 550. When finished, the user will be prompted to indicate whether the album should be published or remain unpublished. When the user chooses to publish the album the entries are assimilated and the final videos are created. The following steps are asynchronous, that is, the user is not required to stay online waiting for the steps to complete. Instead a message will appear stating that they are free to move about the site and that they will be notified via E-mail when their album is published and ready for their viewing. Steps to be completed include extracting new stills for any trimmed scenes, creation of a customized title screen, creation of a final streaming version of the album and moved to the appropriate directory, and the creation of the final high resolution version of the storyboard. In one implementation, a final MPEG-I and CD directory structure is created and stored at the processing site. The final high resolution version can include proprietary productions screens and customized title screens. A contact sheet is also created and stored at the processing site. When all publishing steps are complete an E-mail is sent to the user with specifics on how to order a product (CD of the album) and an indication that they must order this album within specified time period days. If the album is marked as shared, then included in this E-mail is an album ID, password, and instructions for guest login. If an album is designated as public, a URL is generated for that album and sent via E-mail to the user. That URL will then point directly to the public album. In one implementation, a check is made to determine if the addition of the published album will violate the user's maximum storage space allocated in the database 74. If so then the album is not published and instead, the user is directed to delete existing albums to create space for the new one.

After publication, the user can invite friends to view or order an album (516). In one implementation, the user interface 550 includes a invite button 569 that can be invoked to create an E-mail to be distributed with instructions to one or more invitees to view the published album. When an album is designated as shared, the user receives an E-mail with the Album ID, password and instructions for viewing. The user can then forward this information to their guests. On the guests' login page the guest will enter an Album ID and a password associated with this album as well as their preferred bit stream. The guest will then be taken to a screen that shows the key frames of the published album and instructions on how to view the album. In one implementation, when a guest clicks on a key frame, a Real Player pops up and plays the album. In one implementation, the server system 70 will include functionality to set the number of guest views of an album. If an Album is designated as public, a URL is generated for that album and sent via E-mail to the user. That URL will then point directly to the public album. This completes the album creation and publication process.

Figure 5E:
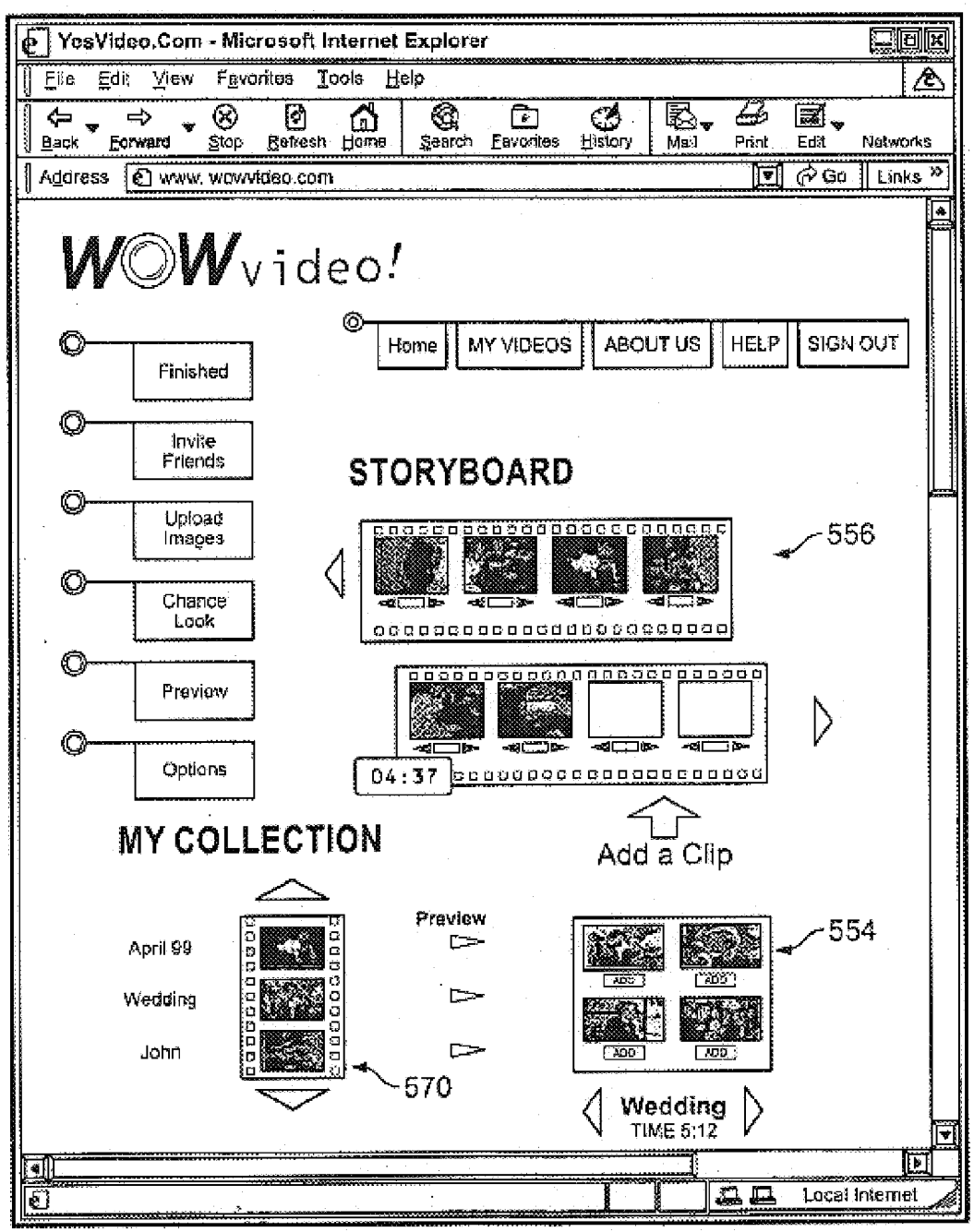
FIG. 5e shows a user interface for an alternative editing page.

Referring to FIG. 5e, in one implementation a third frame, a collection frame 570, is included in the user interface 550. The collection frame presents albums that have been previously compiled by the user. Each album has associated with it a single representative thumbnail which can be viewed by the user. An album from the collection frame 570 can be selected by the user. Each scene in the selected album is then displayed in the clip frame 554. Scenes from the selected album can be included in the storyboard as described above.

Figure 5F:
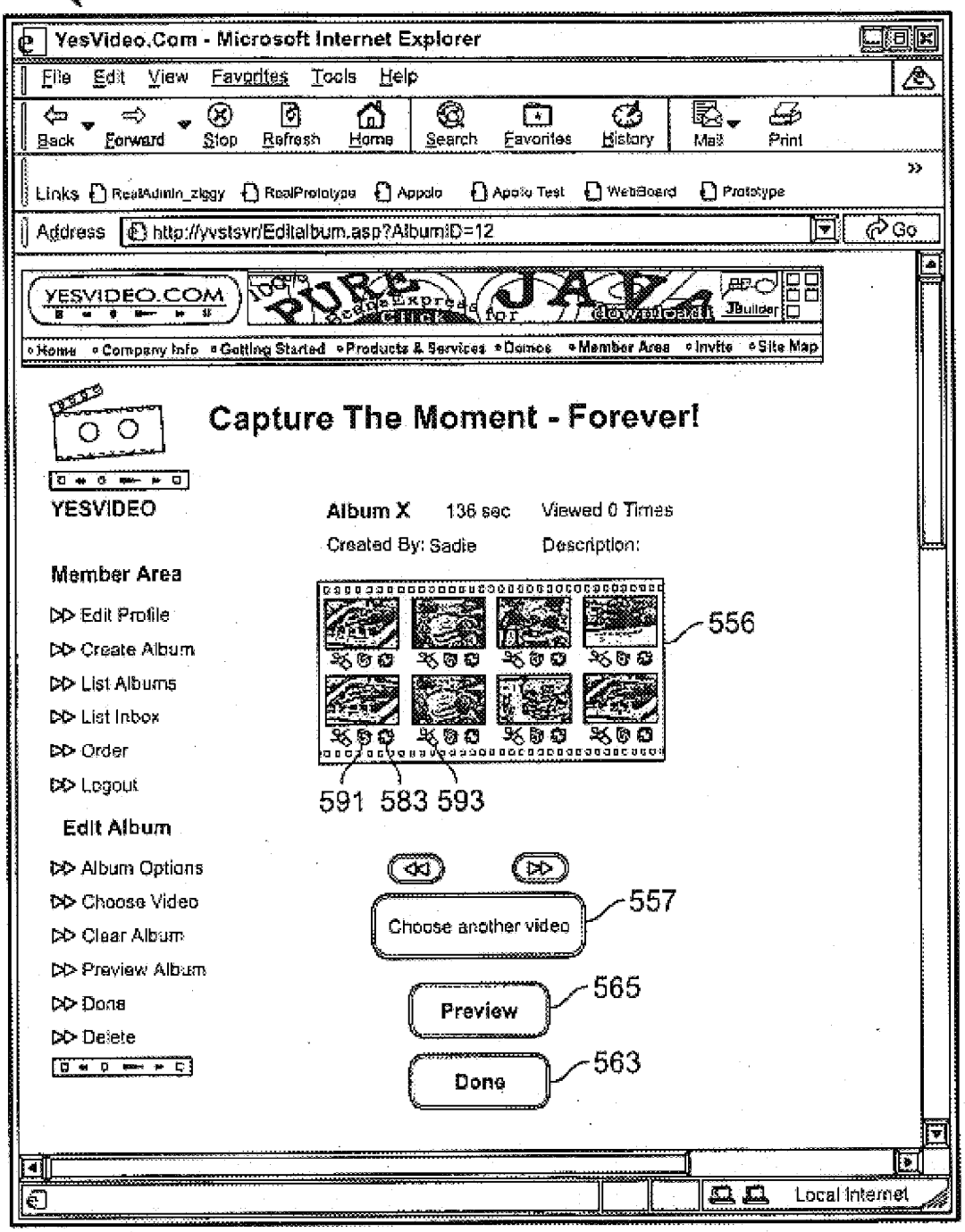
FIG. 5f shows a user interface for a second alternative editing page.

Referring to FIG. 5*f*, in one implementation the editing page includes a user interface 595 that presents a storyboard 556, a video selection button 557, a preview button 565 and finished button 563.

Figure 5G:
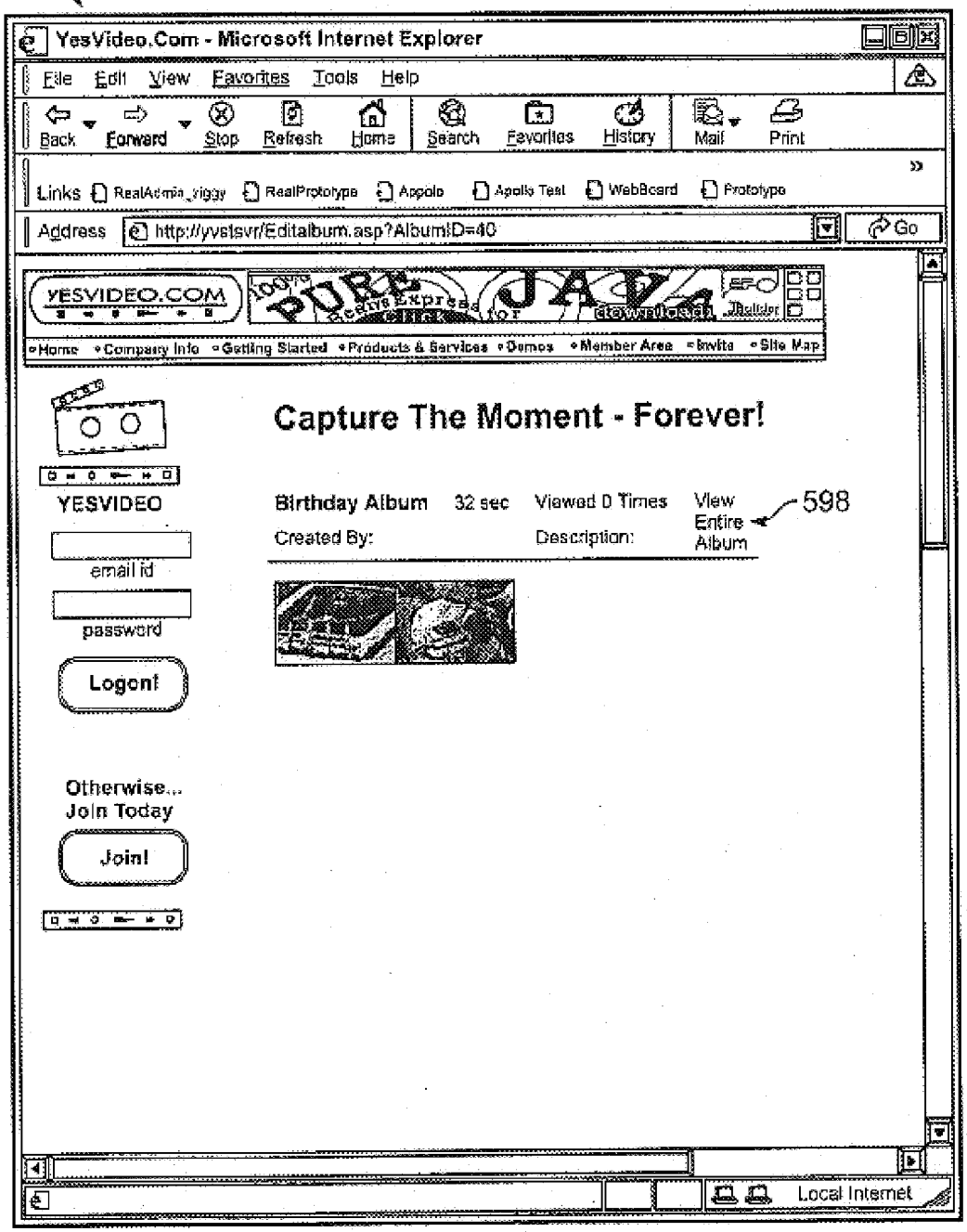
FIG. 5g shows a user interface when a selection button of FIG. 5f is activated.
Figure 5H:
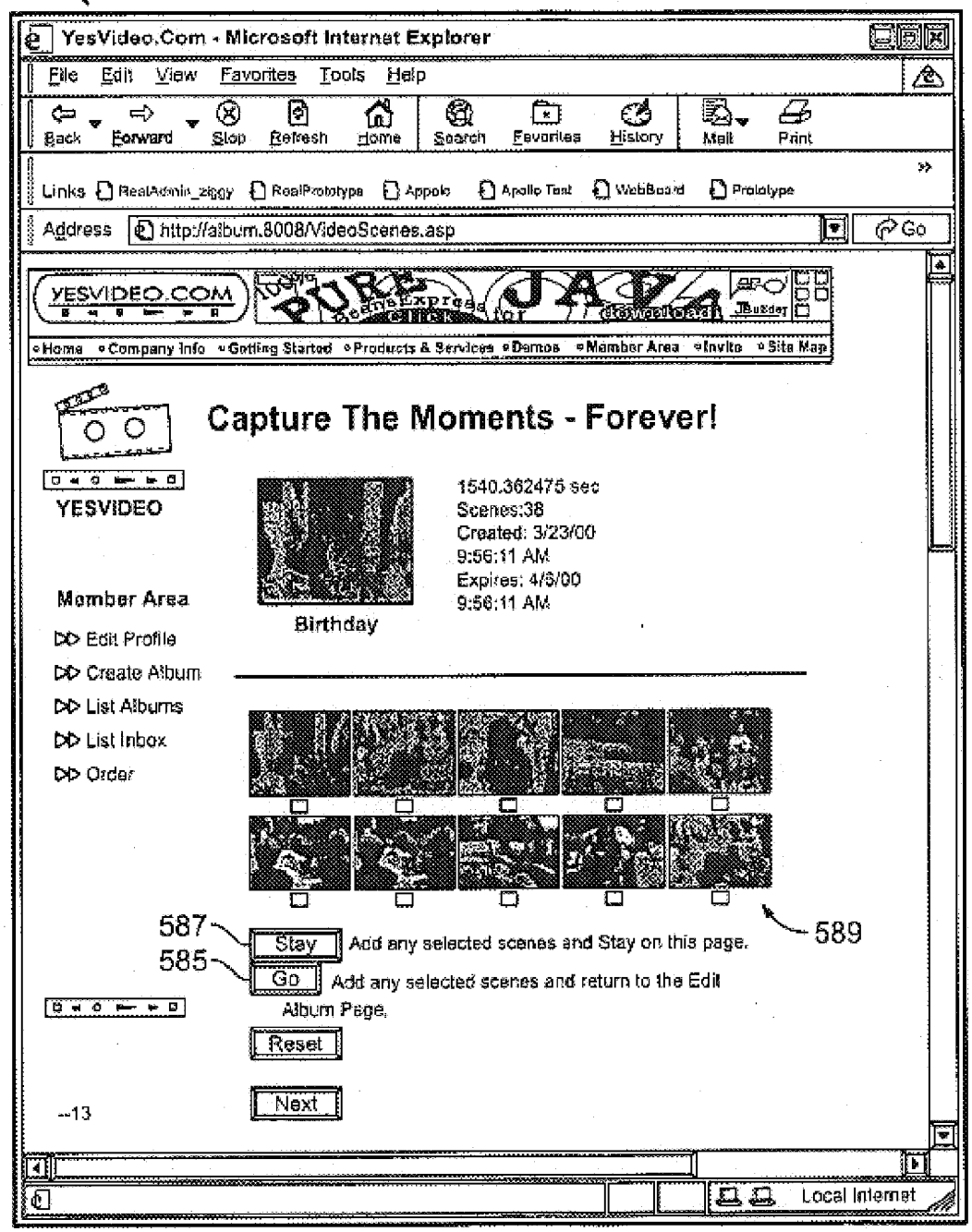
FIG. 5h shows a user interface when a view button of FIG. 5f is activated.
Figure 5I:
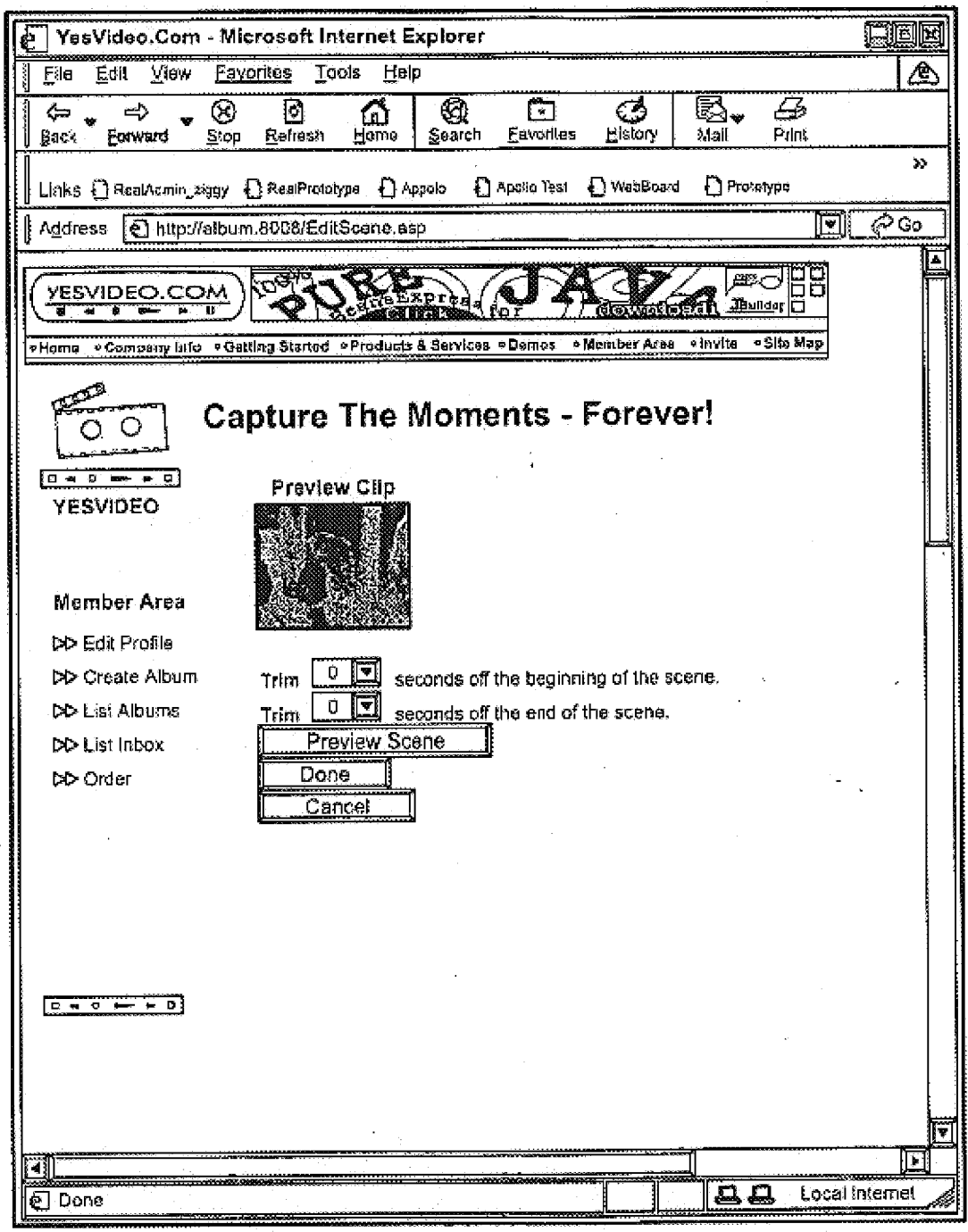
FIG. 5i shows a user interface for trimming a scene.

The storyboard 556 includes scenes and controls (trim control 593, delete control 595 and shift control 583). Trim control allows a user to trim an individual scene. A user interface presented for trimming a scene is shown in FIG. 5*i*. The user interface includes controls for selecting an amount of time to trim from the beginning and end of the scene along with preview functions. Referring again to FIG. 5*f*, the selection of the delete control 595 will delete the selected scene from the storyboard. The user can manipulate the shift control 583 to reorganize scenes in a storyboard.

When the selection button 557 is actuated, a list of other videos that can be reviewed is presented. An example of the user interface 597 shown when actuating the selection button 557 is shown in FIG. 5*g*. Thereafter a user can select one of the available videos for review by selecting a view button 598. The user interface presented 599 when selecting the view button is shown in FIG. 5*h*. A user can select individual scenes for inclusion in storyboard 556 by selecting a box 589 and the stay or go buttons 587 and 585. A reset button is provided to clear the selections from boxes 589. The stay button causes the selected scenes to be added to the storyboard but the user interface remains on the current page. The go button 585 adds the scenes and transports the user back to the edit page (e.g., user interface 595).

Operational Flow

Figure 7:
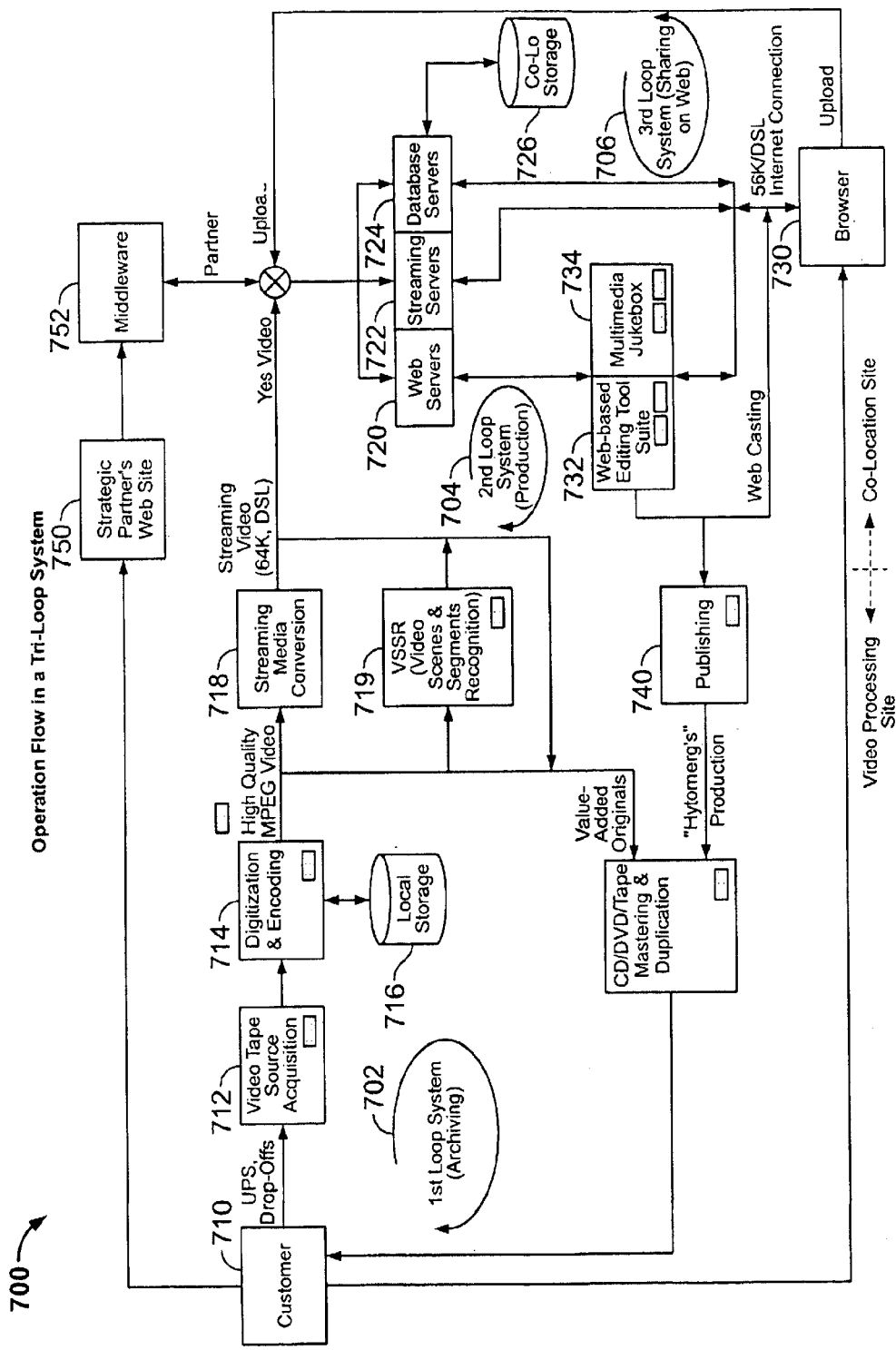
FIG. 7 shows an operational flow for the system of FIG. 1

Referring now to FIG. 7, an operational flow 700 for system 100 is shown. The operational flow includes three loops an archiving loop 702, a production loop 704 and a sharing loop 706.

In the archiving loop, a customer provides content to be processed by the system. The system digitizes and encodes the content and provides a value added function of scene detection. High quality digitized content is stored and a low resolution version is passed to the sever system for viewing and editing by the customer. More specifically, a customer 710 provides a tape for processing (i.e. video tape source acquisition 712) after which digitization and encoding operations 714 are initiated. The digitized and encoded original content is stored locally 716 for future processing (in the production cycle). The high quality encoded and digitized video is converted 718 to a streaming format. The high quality encoded and digitized video is also processed by a scene detection system to detect individual segments in the original content 719.

In the production loop, the scene detected streaming version of the high resolution content can be edited and organized into an album that can be published. The scene detection information and streaming format data for any received tape is provided to the database server 724. The database server stores the streaming format content and scene detection information in a local storage 726. The customer accesses a browser 730 to view the content. A web server 720 presents the user with web-based editing tools 732 for manipulating the scene detected content as described above to form an album of content. The user can also view scenes by accessing a streaming server 722. The web server 720 can also allow the customer to access other content that can be included in an album for example from a multimedia jukebox 734.

Alternatively, content can be directly provided by a third party to the server system and bypass the archiving loop. That is, the customer can access a strategic partner 750, for example through the Internet, and provide content to the strategic partner. The strategic partner can intake and process content and provide content through middleware 752 to the server system for inclusion in a customer album. The third party can provide: upload content (this content goes into the upload loop) and customer support (e.g., the third party has its own web site and provides support to the customers). When a customer orders a service, the tape can be sent to the third party or directly to the server system. After processing, material can be posted through the third party website.

In each case, the customer produces an album as a finished product in the production loop. When the customer has completed the editing process, the album is published 740. A edit list is produced that describes the final published content. A mastering and duplication service can produce a CD from the edit list. Alternatively, the album can be published on the Web, and cast to one or more recipients.

In the sharing loop, a customer is directed to a particular album that can be viewed. The customer accesses the album, can in turn edit portions, order copies and share the content just as the original producer of the album.

Production Flow for a CD

Figure 8:
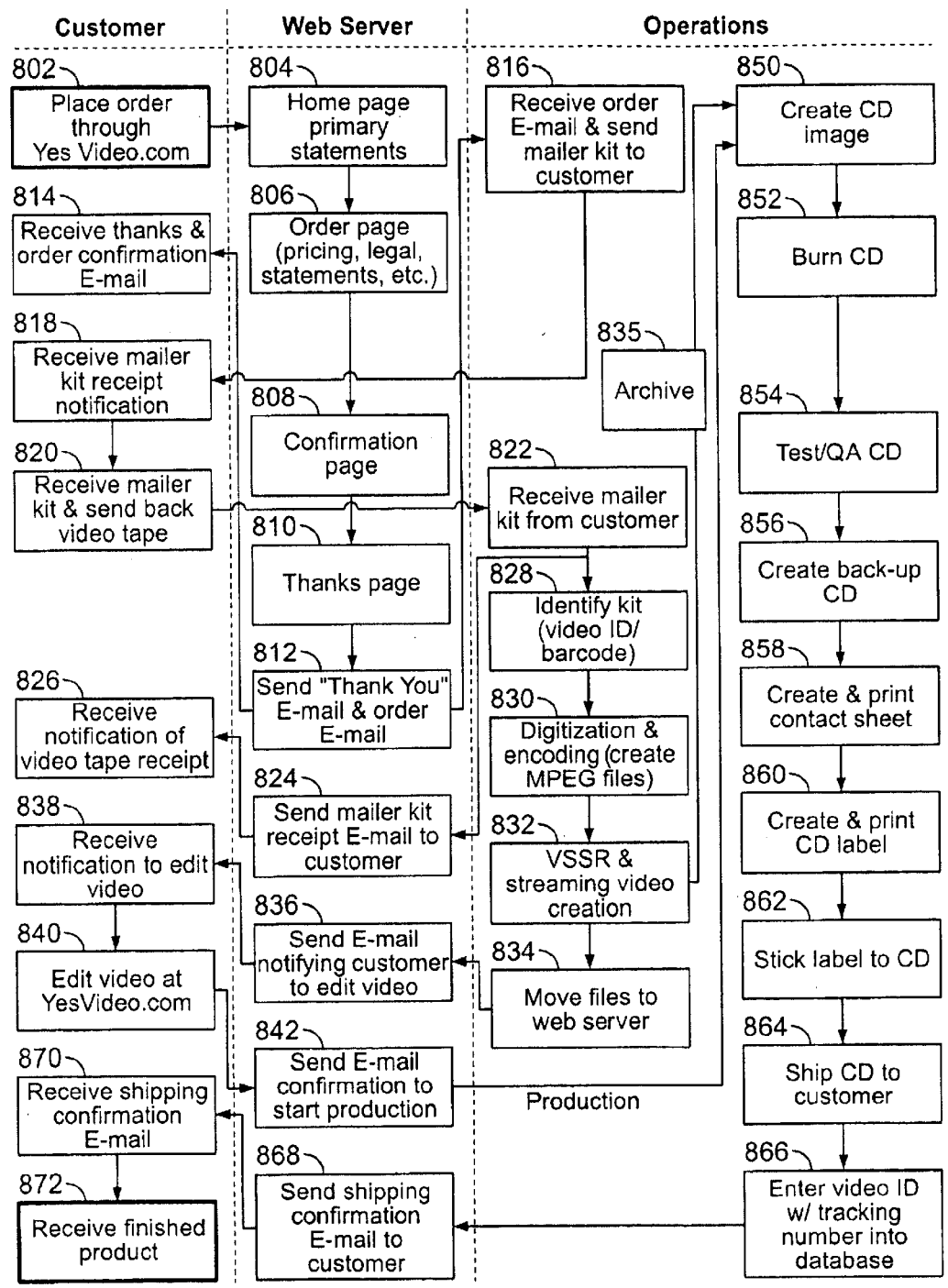
FIG. 8 shows a production flow for the system of FIG. 1

Referring now to FIG. 8, a production flow 800 for the system is show. The operation begins when the customer places an order for an album 802. The customer accesses the web server home page 804 and traverses to an order page 806. At the order page, the customer identifies a product to be ordered and is presented with pricing, shipping and other information. After an order has been completed, a confirmation page is presented to confirm the order details 808. If confirmed, the customer is thanked 810 and sent a confirming e-mail 812 that is received by the customer 814.

A mailer kit is sent to the customer 816, received by the customer 818 and sent back with a tape to the production center 820. The production center receives the mailer from the customer 822 and generates an email 824 that is sent to the customer 826 indicating that the mailer (e.g. tape) has been received. The production system identifies the kit from, for example a bar code on the mailer, and associates the mailer kit with an order 828. The tape is digitized and encoded 830 to create the high resolution content. Thereafter, streaming versions of the digitized content are produced 832 and files are moved to the web server 834 and archived 835. An email is generated 836 and sent to the customer 838 notifying the customer that the digitized content is available for editing at the website. The customer can manipulate/edit the content 840 and then sends a notification to the production system to publish an album 842.

The production system retrieves the high quality content from the archive and produces data to be included in the CD as described above 850. The CD is burned 852 and a quality assurance test is performed 854. A back-up CD can be created 856. A contact sheet is created and printed 858 along with a CD label 860. The label is attached to the finished CD 862 and shipped to the customer 864. A video identifier with tracking information for the CD is entered into a database 866 and a confirmation email is generated 868. The confirmation email is sent to the customer 870 and, if all goes well, the finished product is receive by the customer 872.

Alternative Implementations

In one implementation, the website includes a master table of contents for aggregating content from multiple sources. The master table of contents links information from local, a home page and other URLs for inclusion in an album.

In one implementation, in addition to the video products produced, a CD quality still image can be extracted from the original high quality digitized video source. The still images can be distributed as any form of image-based product including mugs, prints, t-shirts or distributed using E-mail.

In another implementation, published albums and other content can be viewed using a Multimedia Jukebox™. The Multimedia Jukebox™ can be used to organize videos, audio, text, images all in one place with one-click access.

In another implementation, rather than detecting scene breaks, other temporal indices can be used to trigger segmentation of the input content. Character recognition, subject recognition, voice recognition or other technologies can be employed to divide the input content. For example, the input content can be divided upon detection of a change in speech pattern (e.g., a difference person speaking or upon the detection of the beginning of a speech) or upon the appearance or disappearance of an individual from a scene.

In one implementation, the system can create (either automatically or under the direction of the user) an edit list that defines a series of start and stop points in the video content. Associated with each edit list can be one or more filters or other effects to be applied to the segment.

In one implementation, the system allows the user to create a playlist. A playlist editor can be used to guide the display of a particular sequence of content. For example, each album can have an associated table of contents that describes all of the content in the album. A play list can be created for the album that sequences through some or all of the content in the album in the order specified by the user. In one implementation, a playlist player is included in the content provided to each of the distributees. The playlist player receives as an input the playlist and plays the contents of the album in accordance with the instructions contained therein. The playlist allows the user to select only the segments they want to see, in the order they choose.

In one implementation, in addition to the selection of content, the playlist editor can include tools for allowing the user to edit or otherwise manipulate the content of an album. For example the playlist can include tools for trimming segments, applying filters to segments or other editing functions such as applying titles or other special effects. The playlist editor allows the user to trim the length of any included segment, show the same segment multiple times, and add titles, special effects, etc to display a personalized version of the content. Others can select their own playlists which can be shared as they like.

In one implementation, the playlist editor includes tools for performing all of the editing functions described above with the web-based editing system. Playlists can be uploaded to the central system to allow the user to distribute personalized content to different distributees. For example, digitized content can be shared with everyone: Once one or more personalized playlists are produced, the playlist(s) can be uploaded and then processed as if the order had been prepared on-line. In one implementation, the editing page presented in the user interface can include a "share" button. Invoking the share button, a user can order new physical media (e.g., CDs) of a personalized nature. Uploading is simple and quick since the playlist player only sends the central system a small text file (i.e., the playlist information) In this implementation, the edited CD's are just as high quality as the original physical media produced.

In another implementation, the physical media may include video tapes. A user can specify the format of the output content that is to be delivered to the distributees. For example, a VHS copy of an album can be ordered for those without access to a CD-ROM drive.

In one implementation, rather than receiving a physical manifestation that includes the digitized video content, the user may order an Internet webcast. In one implementation, the webcast can be up to 5 minutes for up to 20 viewings with additional length and viewings available at minimal extra cost.

As described above, the process of delivering content to the distributes can include a sharing option. For example, once the user creates an album, the user has a number of choices to make. Choices range from the format of the delivery (CDR, DVD, online broadcast etc.), the distribution list (who you want to share content with), the distribution means (the system can provide copies to the user or distribute the copies to each recipient), and storage options. In one implementation, the user can save albums scenes and other content (playlists, edit lists, stills and other content) in a personal multimedia jukebox.

The present invention has been described in terms of specific embodiments, which are illustrative of the invention and not to be construed as limiting. Other embodiments are within the scope of the following claims.

What is claimed:

1. A method for producing a video disc comprising:
   acquiring video data from a source;
   if the video data is not digitized, then digitizing the video data;
   generating scene indexes for the video data including a representative still image for each scene; and
   combining the video data and scene indexes along with a media player on a video disc, the media player being a software application that is operable to play the video data in accordance with the scene indexes including playing a scene from the video data on a client computer while displaying the representative stills for other of the scenes available for display on the video disc.

2. The method of claim 1 wherein the step of acquiring includes capturing the video data from an analog source.

3. The method of claim 1 wherein the step of acquiring includes capturing the video data from a digital source.

4. The method of claim 1 wherein the step of generating scene indexes includes
   detecting a transition between consecutive frames in the video data;
   determining when the transition indicates a scene break; and
   marking the end of the previous scene and a beginning of a new scene at a point in time that corresponds to the initially detected transition.

5. The method of claim 4 wherein the step of detecting a transition includes detecting a color difference between the frames.

6. The method of claim 5 where the step of detecting a transition includes determining if a difference between frames exceeds a preset threshold.

7. The method of claim 5 further comprising cropping one or more of the frames prior to detecting a color difference to eliminate effects from the boundary of the image frame.

8. The method of claim 4 wherein the step of detecting a transition includes detecting a motion difference between the frames.

9. The method of claim 8 where the step of detecting a transition includes determining if a difference between frames exceeds a preset threshold.

10. The method of claim 8 further comprising cropping one or more of the frames prior to detecting a motion difference to eliminate effects from the boundary of the image frame.

11. The method of claim 4 wherein the step of detecting a transition includes detecting a color and motion difference between the frames.

12. The method of claim 11 where the step of detecting a transition includes determining if a difference between frames exceeds a preset threshold.

13. The method of claim 11 further comprising cropping one or more of the frames prior to detecting a color and motion difference to eliminate effects from the boundary of the image frame.

14. The method of claim 4 where the step of determining when a transition indicates a scene break includes comparing plural frames to a last frame thought to be part of a preceding scene;

if for each frame a transition is detected, then determining that a scene break is indicated; and else, determining that no scene break is indicated and continuing to search for a next scene break.

15. The method of claim 1 where the step of generating representative stills for each scene includes selecting a first frame from each scene.

16. The method of claim 1 where the step of generating representative stills for each scene includes selecting a frame from an introductory group of frames from each scene.

17. The method of claim 16 where the step of selecting a frame includes determining a color distribution for plural frames in a scene and selecting a frame from the introductory group that is a best match to the determined color distribution.

18. The method of claim 1 further comprising creating a contact sheet for distribution with the video disc that includes each representative still for the scenes detected on the video disc.

19. The method of claim 1 wherein the video disc is a compact disc.

20. The method of claim 1 wherein the video disc is a digital video disc.

21. A method for producing a video based product comprising:

acquiring video data;

generating temporal indices including analyzing the video data to detect the temporal indices, the temporal indices indicating a division of the video data into distinct segments;

providing a media player, being a software application that is operable to play the video data on a client computer in accordance with the temporal indices; and packaging the video data, the temporal indices and media player on a physical medium for delivery to the client computer.

22. The method of claim 21 further comprising digitizing the video data prior to packaging the video data.

23. The method of claim 21 further comprising generating representative stills for one or more segments.

24. The method of claim 23 wherein the media player is operable to display one or more of the representative stills while playing the video data on the client computer.

25. The method of claim 21 further comprising generating representative stills for each segment.

26. The method of claim 21 further comprising:

providing a media editor operable to generate one or more edit lists, each edit list defining a set of operations to be performed on the video data by a second computer, so as to allow editing operations defined on a first computer to be replicated on the second computer;

editing the video data in accordance with the edit lists on the second computer; and distributing the edited video to user designated distributees.

27. The method of claim 21 wherein the packaging step includes producing a physical manifestation of the content to be delivered.

28. The method of claim 27 wherein the physical manifestation is a video disc.

29. The method of claim 21 wherein the packaging step includes producing a streaming version of the video data in accordance with the temporal indices.

30. The method of claim 29 wherein the packaging step includes receiving a request to webcast the streaming version of the video data; and streaming the streaming version to a requester.

31. The method of claim 26 where the distribution of the edited video includes providing the edit list to a central distribution site, generating the edited video at the central distribution site and directly delivering the edited video to the distributees.

32. The method of claim 26, wherein the first computer is the client computer.

* * * * *